United States Patent [19]

Lloyd, III

[11] E Re. 29,167

[45] Reissued Apr. 5, 1977

[54] TWIN HULL VARIABLE DRAFT DRILLING VESSEL

[75] Inventor: Samuel Harry Lloyd, III, Mill Valley, Calif.

[73] Assignee: Santa Fe International Corporation, Los Angeles, Calif.

[22] Filed: May 15, 1975

[21] Appl. No.: 577,674

Related U.S. Patent Documents

Reissue of:

[64] Patent No.: 3,616,773
Issued: Nov. 2, 1971
Appl. No.: 766,662
Filed: Sept. 4, 1968

U.S. Applications:

[63] Continuation of Ser. No. 221,769, Jan. 8, 1972, abandoned.

[52] U.S. Cl. ..... 114/264

[51] Int. Cl.[2] ..... B63B 35/00

[58] Field of Search ..... 114/.5 D, .5 R, 43.5 R, 114/43.5 VC, 43.5 AC, 125; 61/46.5

[56] References Cited

UNITED STATES PATENTS

| | | | |
|---|---|---|---|
| 2,375,286 | 5/1945 | Creed | 61/46.5 |
| 2,973,046 | 2/1961 | McLean et al. | 61/46.5 |
| 3,246,476 | 4/1966 | Wolff | 114/.5 D |
| 3,273,526 | 9/1966 | Glosten | 114/.5 D |
| 3,279,407 | 10/1966 | Stenger | 114/125 |
| 3,294,051 | 12/1966 | Khelstovsky | 114/.5 D |
| 3,385,069 | 5/1968 | Estes | 61/46.5 |
| 3,397,545 | 8/1968 | Leavitt | 114/.5 D |
| 3,490,406 | 1/1970 | O'Reilly | 114/.5 D |

*Primary Examiner*—George E. A. Halvosa
*Assistant Examiner*—Stuart M. Goldstein
*Attorney, Agent, or Firm*—LeBlanc & Shur

[57] ABSTRACT

The vessel comprises a pair of laterally spaced elongated hulls having a plurality of upstanding columns spaced therealong supporting a working platform in spaced relation above the hulls a distance slightly greater than the maximum anticipated wave height. The hulls buoyantly support the vessel in a low draft floating condition with the hulls having freeboard. The hulls have ballast compartments to submerge the hulls and portions of the stabilizing columns to a distance of approximately half the effective height of the stabilizing columns which is slightly greater than maximum anticipated wave height, to maintain the vessel in a high draft floating condition with the platform elevated above the waterline. The columns stabilize the vessel in the high draft condition about roll and pitch axes. The working platform mounts either a drilling rig or a heavy duty crane or like operational equipment along the centerline of the vessel.

66 Claims, 11 Drawing Figures

INVENTOR
SAMUEL HARRY LLOYD III

BY Le Blanc & Shur
ATTORNEYS

INVENTOR
SAMUEL HARRY LLOYD III

BY Le Blanc & Blum

ATTORNEYS

INVENTOR
SAMUEL HARRY LLOYD III

BY Le Blanc & Shur

ATTORNEYS

INVENTOR
SAMUEL HARRY LLOYD III

BY Le Blanc & Shurtz

ATTORNEYS

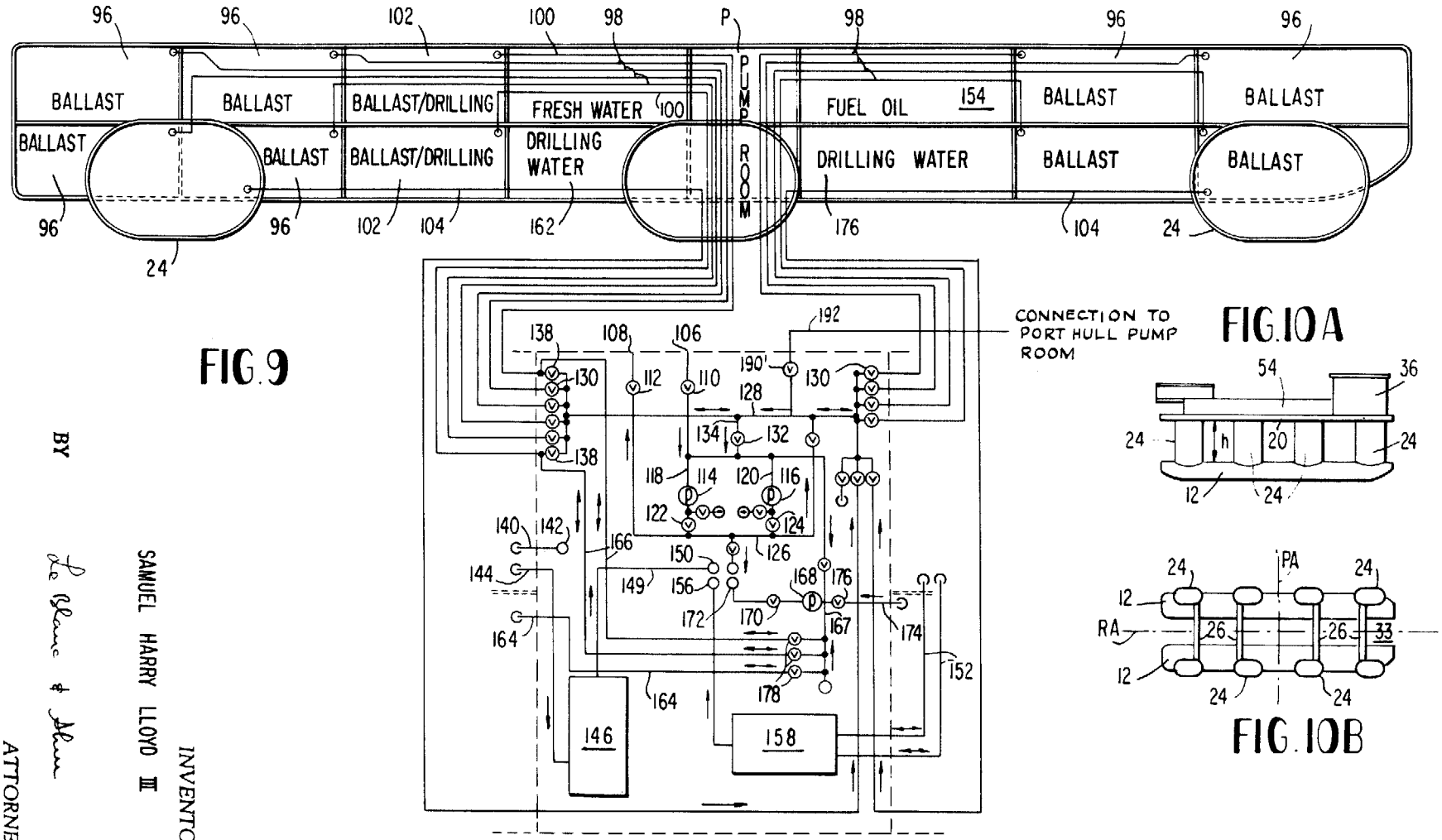
INVENTOR
SAMUEL HARRY LLOYD III
BY LeBlanc & Shur
ATTORNEYS

TWIN HULL VARIABLE DRAFT DRILLING VESSEL

Matter enclosed in heavy brackets [ ] appears in the original patent but forms no part of this reissue specification; matter printed in italics indicates the additions made by reissue.

[This application is a continuation-in-part of application Ser. No. 666,395, filed Sept. 8, 1967 and now abandoned.] *This is a copending continuation of application Ser. No. 221,769 filed Jan. 8, 1972 as an application for reissue of U.S. Pat. No. 3,616,773 issued on Nov. 2, 1971, said application Ser. No. 221,769 now abandoned in favor of this application. Said U.S. Pat. No. 3,616,773 issued from application Ser. No. 766,662 filed Sept. 4, 1968, said Ser. No. 766,662 being a continuation-in-part of application Ser. No. 666,395 filed Sept. 8, 1967 (abandoned).*

BACKGROUND OF THE INVENTION

This invention relates to a variable draft vessel having twin hulls for use with a drilling platform and other deck load and which is adapted for deep water drilling and other operations.

In attempts to locate new oil fields, an increasing and significant quantity of well drilling has been conducted in offshore sea and like locations where a substantial body of water overlies the oil field. This has generated considerable interest and effort in offshore and deep water drilling. One current method of offshore drilling utilizes a fixed drill platform mounted on legs resting on or driven into the sea floor. These, however, are feasible for use only in relatively shallow depths of water normally not greater than about 300 feet, which is a realistic depth limit for practical commerical operations. Deep water drilling has heretofore been accomplished with the employment of specifically designed and constructed vessels or rigs which have certain inherent disadvantages and limitations noted hereinafter. A brief review of both offshore and deep water drilling methods heretofore practiced and the vessels or rigs employed therewith will provide a more clear appreciation and understanding of the present invention, as well as a clear distinction between those vessels or rigs employed in offshore drilling and those employed in deep water drilling.

An early method of offshore drilling, still currently employed, provides for the erection of a self-contained fixed platform which is supported by pilings driven into the sea floor and has a drilling rig, auxiliary equipment and crew's quarters located on the platform. At the conclusion of the drilling, a tender is brought to dismantle and remove the drilling equipment and, in the case of a dry hole, the entire self-contained platform is dismantled and removed by tender. A variation of the foregoing method provides a somewhat smaller platform similarly erected on piles and having a drilling rig located thereon while the auxiliaries, equipment and crew are located in a tender tied alongside. At the conclusion of the drilling, the platform is likewise either left for oil production or is dismantled and removed in the case of a dry hole. Another method employs a self-elevating barge which is towed to the drilling site and provided with columns or legs which are then lowered and embedded in the sea floor. The barge is then jacked up so as to clear the water surface and serves as a platform on which the drilling rig, crew, and auxiliary equipment are subsequently positioned for drilling operation. At the conclusion of the drilling, in the event of a producing well, a fixed platform generally is erected for continuing oil production and the self-elevating barge is towed to another drilling site. The foregoing methods are each feasible for use in relatively shallow water depths of normally 300 feet or less. The factors governing construction and operation of the vessels or rigs utilizing any of the foregoing arrangements are not significantly concerned with stability and other problems involved in conducting a drilling operation from a floating platform, as in deep water drilling, since the above-discussed rigs and vessels are constructed for sea bottom engagement.

Deep water and exploratory drilling has been accomplished by means of surface floating drilling vessels which are either towed or self-propelled to the drilling site and are self-contained in that the drilling rig, auxiliary equipment and crew's quarters form an integral part of the vessel. These floating drilling vessels are anchored over the drilling site and are normally provided with a central opening through which the drilling rig is operated. Drilling operations from these floating vessels are, however, highly restricted by sea state conditions, since excessive vessel motion in heave, pitch and roll can and does damage the drilling equipment as well as aggravate the problem of maintaining the vessel anchored directly over the drilling site. The stability characteristics of such a single-hulled drilling vessel are accordingly not conducive to efficient oil drilling operations. A catamaran type oil drilling vessel has been constructed; however, while that type vessel affords greater stability than a single-hulled vessel, it involves substantial problems which include excessive vessel motion due to wave action, no substantial motion minimizing characteristics, overstability and resultant "snapping" action which tosses personnel about and may endanger the drilling string and other equipment. Accordingly, while these vessels are not geographically limited to offshore drilling operations, they are limited to use in restricted or calm waters.

Deep water and exploratory drilling operations have also employed semisubmersible platforms which, like the floating vessels, are completely self-contained. In this latter type, the platform is supported on a plurality of structural members including stabilizing columns joined at their lower ends to a base flotation structure which, when in unballasted condition, floats the entire structure above the surface of the water with the base structure having freeboard. After being towed in freeboard condition to the drilling site, the base flotation structure is deballasted to submerge the same. To maintain the drilling platform above water in a relatively stabilized condition, the platform support structure includes a plurality of columns which extend between the platform and the base structure and are partially submerged to the extent that the displacement of such columns in conjunction with any residual displacement of the base structure supports the overall semisubmerged structure.

In one type of these prior semisubmersible platforms, the stabilizing patterns of the stabilizing columns form substantially symmetrical equilateral polygons with the columns located at the apices of the respective polygons which are normally square or triangular in shape. The equilateral symmetrical polygonal arrangement provides substantially identical righting moments about the roll and pitch axes, as well as any intermediate axes, regardless of wave direction. Another form of similar semisubmersible vessel includes a plurality of stabilizing columns interconnected adjacent their upper ends so that only the columns float in the water, with the columns again being arranged in a symmetrical equilateral polygon. In general, while such prior vessels of this type provide adequate stability for well drilling operations, they have an inherent disadvantage of very low mobility between drilling sites due to the shape and frontal area of the polygonally arranged columns and/or base structure presented to the water surface when such vessels are towed; their towing speed often does not exceed 2 knots. Additionally, to achieve the necessary displacement for supporting the full weight of drilling rig, deck load, etc., for such a vessel having a symmetrical equilateral polygonal configuration of base structure and stabilizing columns, such prior type vessels are of such large dimension that they cannot pass through narrow waterways like the Panama and Suez Canals, whereby their use is accordingly restricted.

Accordingly, it is a primary object of this invention to provide a new improved twin hull variable draft vessel which minimizes above-discussed and other shortcomings of prior offshore and deep water drilling rigs and vessels, and provides various advantages in construction, mode of operation and result over prior systems.

It is another object of the present invention to provide a variable draft vessel which, particularly in column stabilized floating condition, has the characteristic of minimizing vessel motion due to excitation forces caused by wave action (hereafter called "motion minimizing characteristic"). It is a related object to provide such a vessel affording improved motion minimizing characteristics in vessel pitch, roll and heave.

It is a related object of the present invention to provide a variable draft column stabilized vessel having rapid mobility in transit.

It is still another object of the present invention to provide a twin hull variable draft column stabilized vessel which is operable in great depths of water as a self-contained drilling vessel.

It is further object of the present invention to provide a variable draft vessel having twin hulls which has a drilling platform mounted on a deck which is above the hulls an effective height slightly greater than the maximum anticipated wave height.

It is still a further object of the present invention to provide a variable draft drilling vessel having stabilizing columns configured to reduce displacement of the vessel in heave in the high draft floating condition due to the inertia thereof and to provide reduced pitch and roll angles.

It is still a further object of the present invention to provide a deep water drilling vessel having twin hulls the draft of which is variable by ballasting and deballasting of the twin hulls to selectively orient the vessel in a low draft floating condition with the hulls having freeboard and a high draft column stabilized floating condition.

It is a related object of the present invention to provide a variable draft deep water drilling vessel having twin hulls including separate ballast compartments in each hull together with ballasting means for selectively ballasting and deballasting the several compartments in each hull thereby selectively correcting the heel and trim angles.

It is another object of the present invention to provide an improved variable draft vessel usable as a tender for other vessels, or as a platform for a heavy duty crane, dredge or other equipment, as well as for a drill rig.

These and other related objects and advantages of the present invention will become more apparent from the following specification, claims, and appended drawings wherein:

DESCRIPTION OF THE DRAWINGS

FIG. 9 is a schematic view of one of the hulls of the vessel illustrating the ballast system therefor; and FIGS. 10A and 10B are elevational and plan diagrammatic illustrations respectively of another embodiment of the vessel hereof.

DESCRIPTION OF A PREFERRED EMBODIMENT

Figure 1:
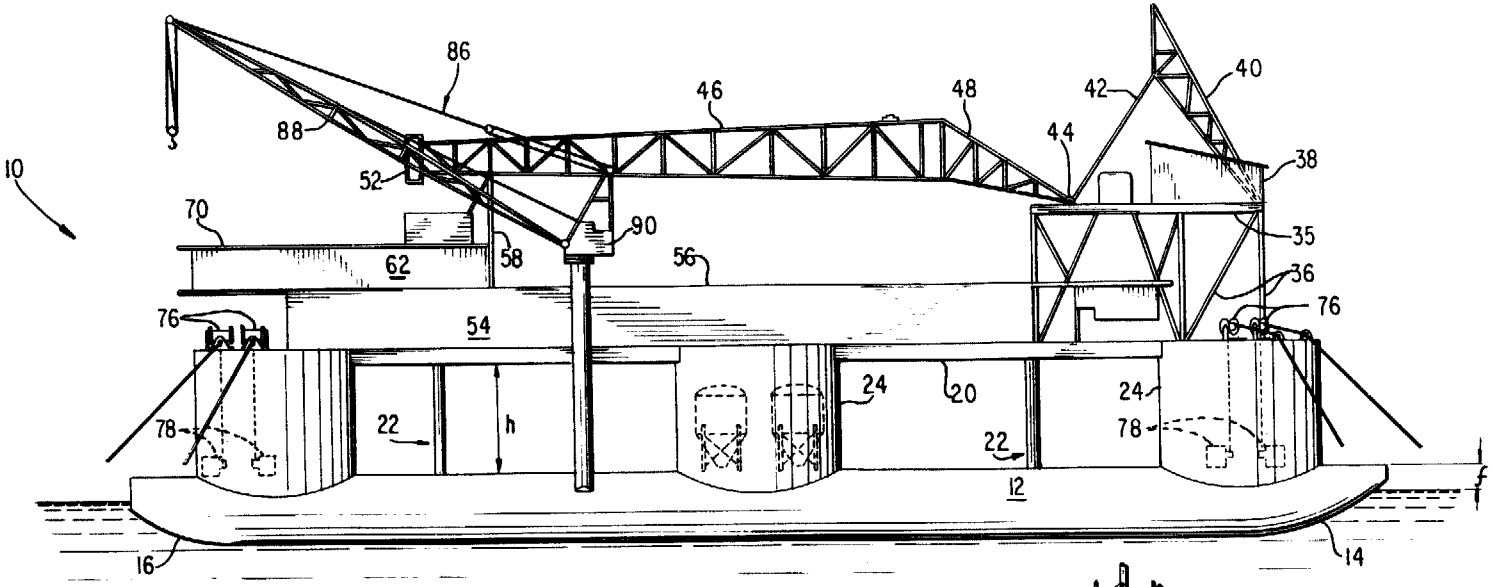
FIG. 1 is a side elevational view of the twin hull drilling platform and tender barge or vessel according to the present invention, with the vessel illustrated in the low draft towing condition.
Figure 5:
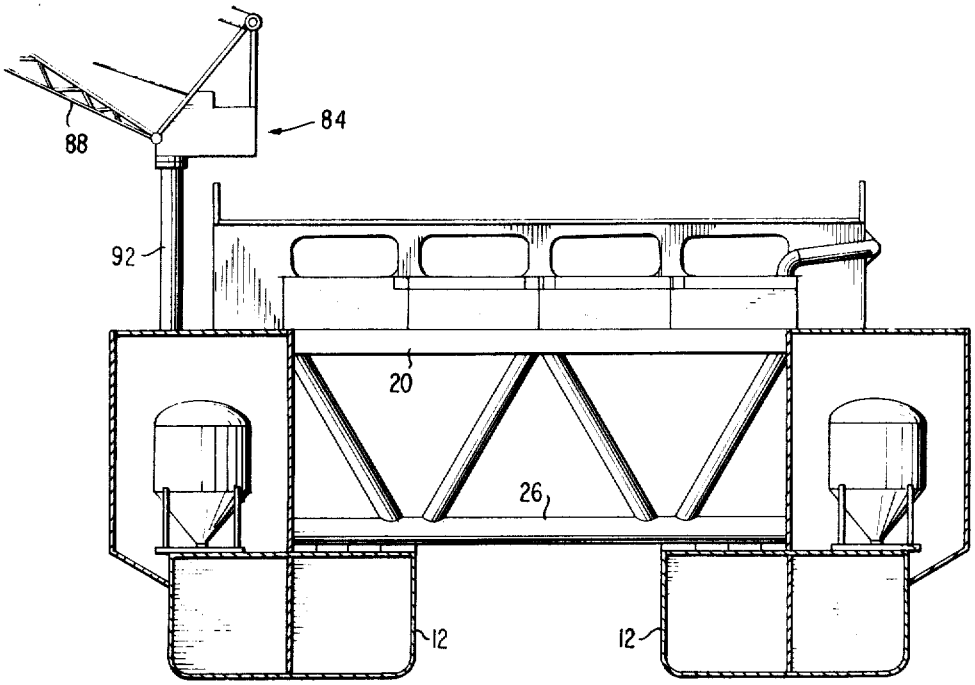
FIG. 5 is a transverse sectional view taken about on line 5—5 of FIG. 4.
Figure 6:
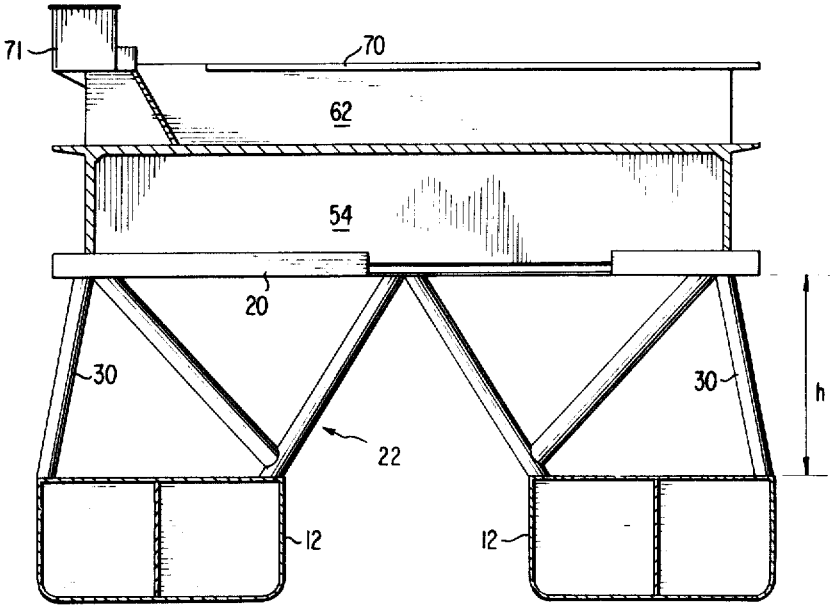
FIG. 6 is a transverse sectional view taken about on line 6—6 of FIG. 4.

Referring to the drawings, there is shown a variable draft drilling platform (hereinafter referred to as a vessel) generally indicated at 10 comprising a pair of transversely spaced, elongated hulls 12 extending in spaced parallel relation and providing sufficient displacement to support vessel 10 in the low draft floating condition with the hulls having freeboard indicated at f. Hulls 12 are substantially identical one with the other, each hull having a substantially rectangular cross section as seen in FIGS. 5 and 6. Each hull 12 has designed hydrostatic properties and hydrodynamic characteristics, including being streamlined for minimum resistance in motion. Each hull has freeboard f and a bow 14 and stern 16 with midbody between. Inwardly curved outboard side formations at bow portions 14 are indicated at 18. Hulls 12 are thus formed substantially streamlined in shape to minimize resistance to towing through the water when vessel 10 is entirely supported by hulls 12 in the low draft floating condition as illustrated in FIG. 1.

Figure 8:
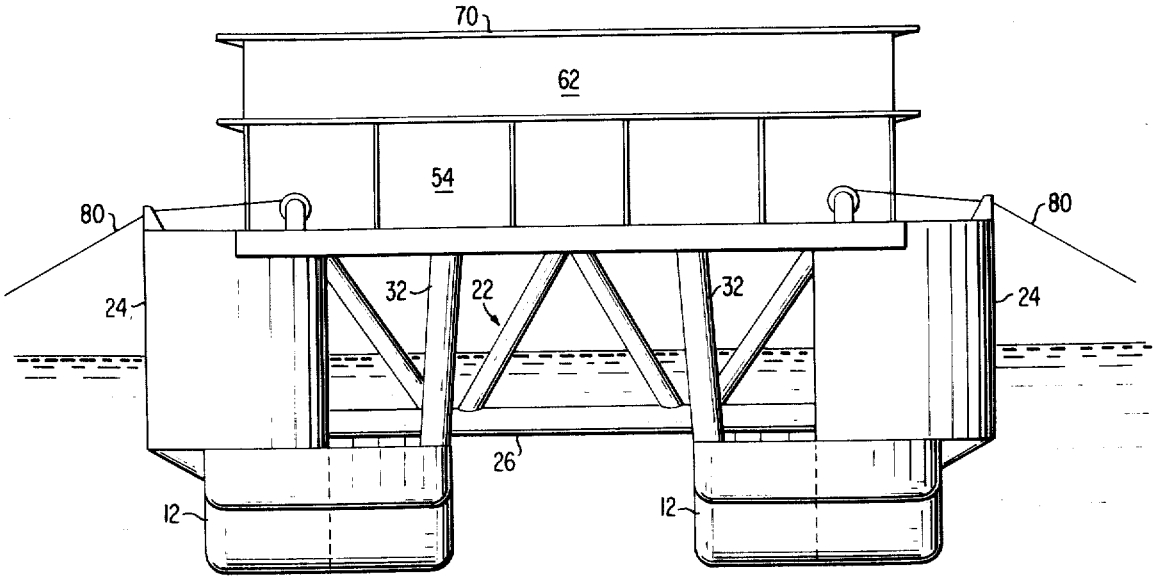
FIG. 8 is an aft end elevational view of the vessel in the column stabilized high draft condition.

A platform or main deck 20 is supported in spaced relation above hulls 12 a predetermined height h (FIG. 1) which is at least equal to and preferably slightly greater than the maximum anticipated wave height, i.e., the vertical distance between wave crest and trough, by support structure comprising a plurality of longitudinally spaced, transversely extending truss formations generally indicated at 22 and a plurality of spaced stabilizing columns 24. The first, second, third and fifth truss formulations 22, looking aft in FIG. 4, each includes a lower transversely extending base tubular member 26 having opposite end portions overlying and secured to hulls 12 to maintain the latter in predetermined spaced relation preferably a distance at least equal to a hull beam. The length of the members 26 of the first, third, and fifth truss formations 22 are identical while the base member 26 of the second truss formation is extended to the longitudinal centerline of the centrally located stabilizing columns 24. A plurality of diagonally and upwardly extending columns 28 are suitably secured at their lower ends to base members 26 and at their upper ends to platform 20 to form a pair of transversely extending V-shaped truss formations as best seen in FIGS. 5, 6, and 8. The fourth truss formation 22 comprises a pair of V-shaped formations without a lower base member. The first, third, and fourth truss formations 22 have outboard columns 30 joined at their lower ends to the outboard edges of hulls 12 and which extend upwardly and inwardly to the outboard edges of platform 20. A plurality of inboard columns 32 extend from the inner edges of hulls 12 upwardly to intermediate portions of platform 20 at longitudinally spaced positions along the hulls between transverse truss formations 22 to provide additional support for platform 20. It will be noted that the forwardmost truss formation 22 is spaced a considerable distance aft of the forward ends of hulls 12 to provide a substantial open area 33, unencumbered by support structure, between forward portions of the hulls. It will be apparent to one skilled in the art in light of the disclosure herein that other specific support constructions and column and truss arrangements can be used in a vessel according to this invention.

As discussed more fully hereinafter, the support structure also includes stabilizing columns 24 extending upwardly from the upper surface of hulls 12, a distance which may be equal to and is preferably at least slightly greater than the maximum anticipated wave height, the vertical distance between wave crest and trough. In the preferred illustrated embodiment, the columns 24 extend upward to platform 20 and form a part of the structural support therefor whereby their effective height is equal to the height h between the upper surface of hulls 12 and the underside of platform 20. In the preferred embodiment, columns 24 are located adjacent opposite ends of each hull 12 with a third column being provided on each hull intermediate the ends thereof. As seen in section in FIG. 4, columns 24 preferably are generally oval shaped with longitudinally elongated vertical sides and cylindrical fore and aft vertical end sections 34. Besides providing streamlining in the direction of the vessel's longitudinal axis, this provides increased vessel stability. Use of columns 24 provides better motion minimizing characteristics when the vessel is in the floating high draft condition. Stabilizing columns 24 are preferably constant in cross sectional area throughout their effective height h. It will be understood that either or both the upper and lower ends of the columns may be reduced in cross section, for example, to form frusto-conical sections, to provide mechanical connection between the columns and the hulls and platform which do not substantially affect the effective height or make the latter subject thereto.

A drilling platform 35 is spaced above main deck 20 adjacent the forward end of the vessel by a plurality of support beams 36 secured at their lower ends to platform 20. A house 38 is provided adjacent the forward end of drill platform 35 adjacent the forward edge thereof. Truss formations 40 have a pair of transversely spaced legs 42 secured at their lower ends to mounting members 44 fixed to platform 35 adjacent the aft edge thereof, legs 42 providing the aft support for trusses 40. There is supported on drill platform 35, a drill rig or derrick 46, having a pair of transversely spaced base truss formations 48 forming diverging legs which are pivotally secured at their lower ends to mounting members 44, whereby drill rig or derrick 46 can be pivotally moved between a vertically extending drill operating position seen in FIG. 2, and a lowered inoperative position seen in FIG. 1. The base portion 48 of derrick 46 seats against and is suitably secured by means not shown to truss formations 40 to maintain the same in a vertical position whereby a drill string 50 can be supported from the upper end 52 of the derrick 46 so that string 50 extends between hulls 12 on the center line of the vessel forward of the first truss formation 22 into open area 33. Main deck 20 has a deck superstructure 54 supporting a weather deck 56 mounting a pair of transversely spaced, upstanding beams 58 carrying a transverse beam 60 at the upper ends thereof for supporting the upper end of derrick 46 when the latter is pivoted to the lowered horizontal position shown in FIG. 1. The main deck superstructure 54 houses the machinery, crews quarters, and additional drilling equipment while weather deck 56 supports an after deckhouse 62 and a plurality of transversely extending pipe racks 64. A longitudinally extending catwalk 66 is positioned intermediate pipe racks 64 to provide access to any portion along the racks. The top deck of deckhouse 62 supports a heliport 70 and ballast control house 71.

Figure 3:
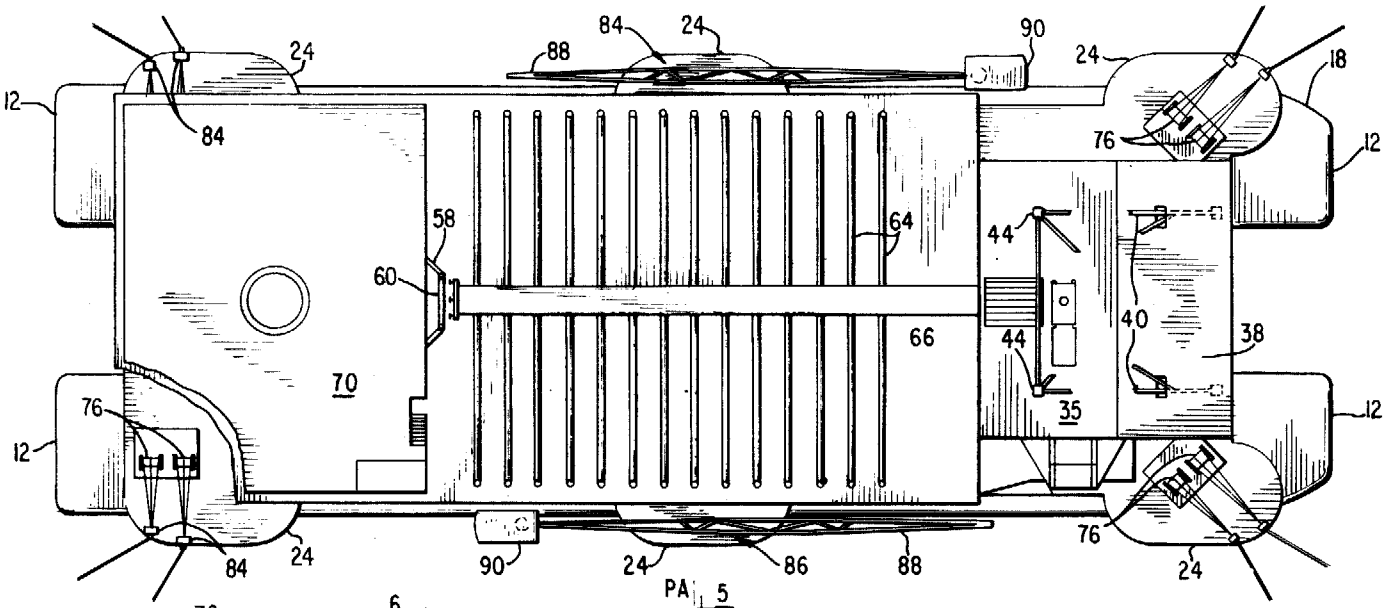
FIG. 3 is a plan view of the vessel, with portions broken out for ease of illustration.
Figure 4:
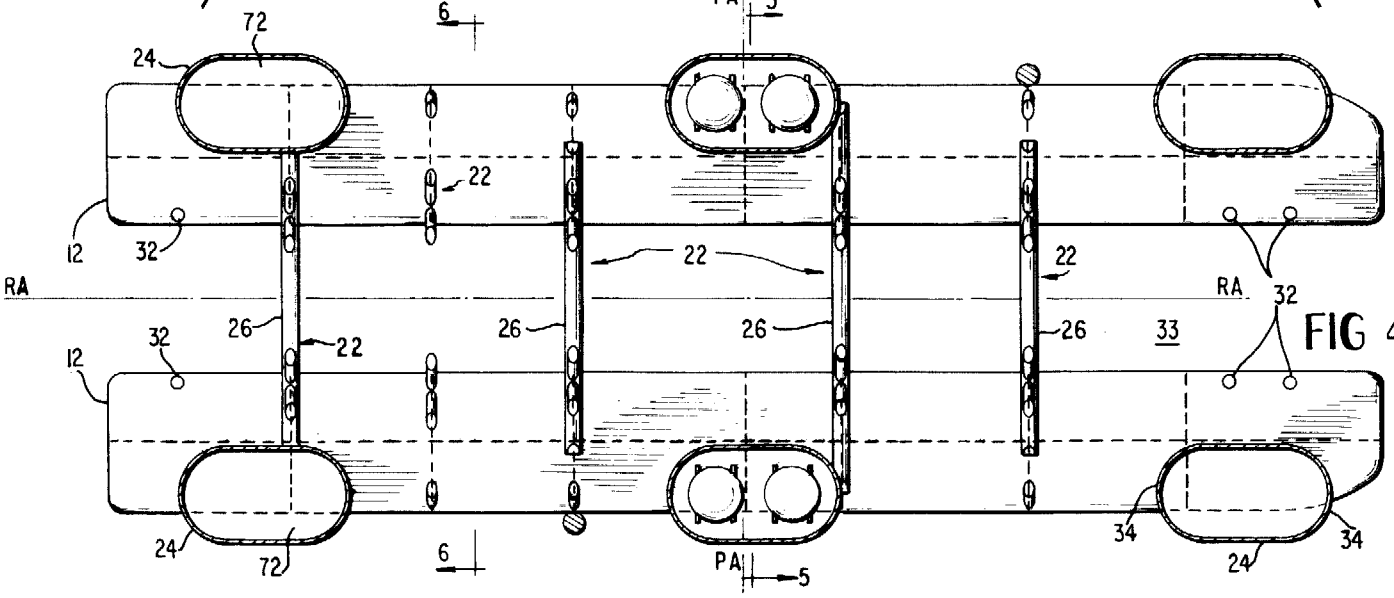
FIG. 4 is a horizontal sectional view taken about on line 4—4 of FIG. 1.
Figure 7:
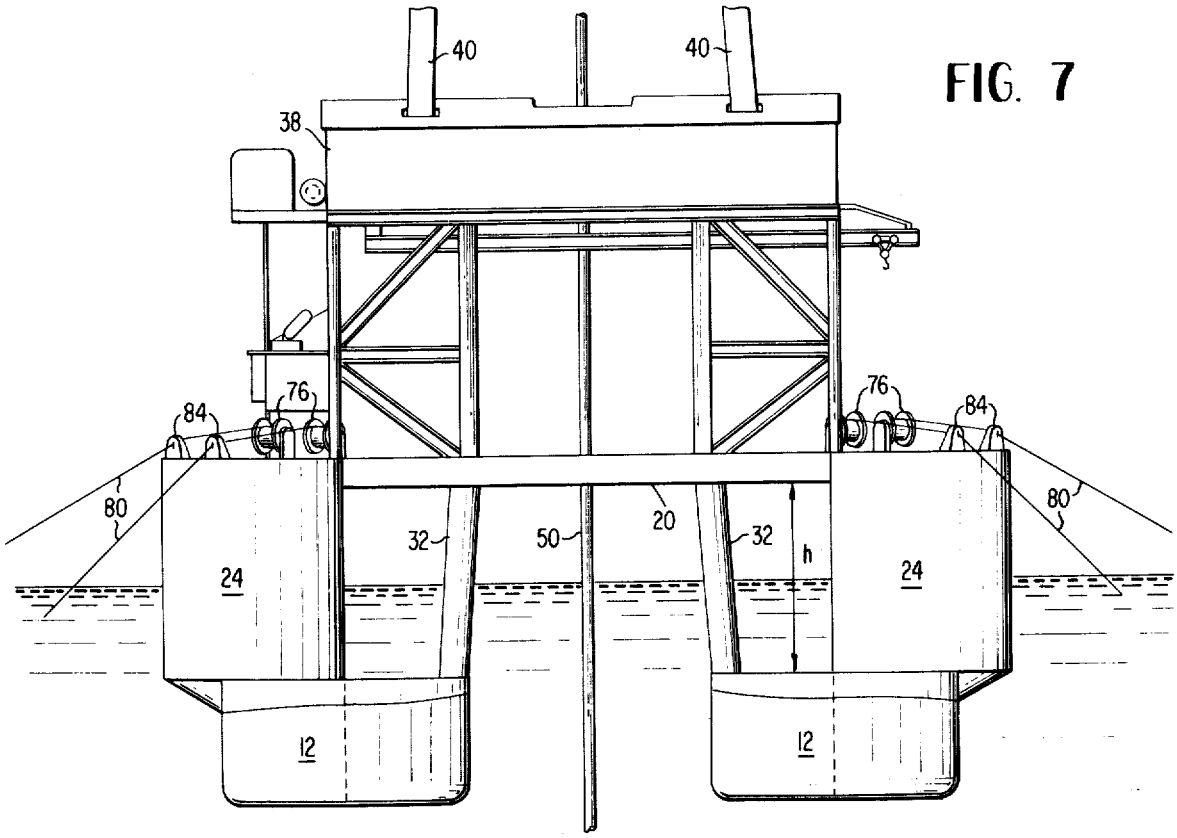
FIG. 7 is a bow end elevational view of the vessel in the column stabilized high draft condition.

In a preferred form hereof, particularly as seen in FIGS. 4, 7, and 8, columns are disposed along the outboard sides of hulls 12 such that the inner faces of columns 24 lie parallel to and in vertical alignment with the center line of the associated hull. The displacement and stability requirements of columns 24 are such that these columns have a transverse dimension locating an outboard portion 72 of each column 24 in overhanging relation to the outer hull sides, with the longitudinal axes of columns 24 being spaced laterally outwardly of the center line of the hulls and located inwardly of and adjacent the outer hull sides. The centroids of the water plane areas defined by the cross sections of the columns 24 are thus located an extended distance from the center line of the vessel on opposite sides thereof to develop larger moments of inertia of the water plane areas about the roll axis than would otherwise be the case if the longitudinal center lines of each of the hulls and their associated stabilizing columns were coincident. The upper surfaces of the outer overhanging portions 72 of columns 24 form a continuation of main deck or platform 20 as seen in FIGS. 3 and 7 and each such upper surface adjacent the corners of the vessel mounts a pair of mooring pulleys 76, which forms a part of the vessel positioning or station keeping system. A pair of mooring winches 78 are located in a machinery space adjacent the bottom of each of the four corner stabilizing columns 24 and carry anchoring cables 80 which extend over pulleys 76 through chocks 84. Winches 78, pulleys 76, and cables 80 provide an 8-point mooring to anchors system which serves to hold and maintain the vessel in fixed position over the drilling site when the vessel is floating in the high draft column stabilized condition. Other types of positioning or station keeping devices, such as dynamic positioning devices, mooring to piles and the like, may be employed with equal facility and the foregoing described anchoring system is representative only of a preferred form thereof.

A pair of cranes 84 and 86 are mounted on opposite sides of the vessel and may be of any conventional design, including the usual booms 88 and operating cabs 90. Cranes 84 and 86 may have any desired capacity, for example, 50 tons, crane 84 having an 80 foot boom and crane 86 having a 100 foot boom. The smaller crane 84 is preferably employed to service the self-contained drilling rig aboard vessel 10 such as for example raising or lowering the drill rig or loading and unloading pipes from pipe racks 64. The heavier crane 86 is preferably employed when vessel 10 is utilized as a tender, for example, in erecting or dismantling and generally servicing other drilling rigs. Crane 84 is pivotally mounted on a supporting column member 92 fixed at its lower end adjacent the outboard side of one of the hulls while crane 86 is pivotally supported on a columnar member 94 spaced from intermediate column 24 and fixed at its lower end to the outboard side of the other hull 12.

As seen in FIG. 9, hulls 12 are each divided into compartments 96 forming a plurality of ballast chambers for varying the draft of the vessel. While only the starboard hull and ballast system therefor are illustrated in FIG. 9, it will be understood that the port hull is similarly arranged and ballasted but is of the opposite hand. Ballast chambers 96 are selectively and independently ballasted and deballasted whereby the vessel may be partially submerged with the platform 20 remaining substantially level throughout the partial submergence of the vessel and the stability of the vessel in both roll and pitch may be corrected during partial submergence and retention of the vessel at the column stabilized, high draft, drilling depth. To this end, a plurality of conduits 98 extend from a centrally located pump room P in each of the hulls in opposite longitudinal directions to the several ballast compartments 96, there being, in the preferred form, four ballast compartments in each of the aft and forward portions of each hull. A pair of conduits 100 extend aft from pump room P and terminate in a pair of compartments 102 which may be employed as supplemental ballast compartments or as compartments containing drilling water. While not a part of the ballasting system per se, a pair of bilge water conduits 104 extend fore and aft from pump room P into the bilges of the hulls and are in communication with the ballast pumps in a manner to be described.

The pump room is provided with a sea suction inlet indicated at 106 and an overboard discharge indicated at 108 controlled by suitable power operated gate valves 110 and 112, respectively, the hull sides being indicated by the dashed lines in FIG. 9. A pair of pumps 114 and 116 are provided to suction sea water through inlet 106, past valve 110, through pumps 114 and 116 via conduits 118 and 120 respectively, past check valves 122 and 124, respectively, and into a conduit 126 communicating with main ballast conduit 128. Opposite ends of *a* main conduit 128 communicate with fore and aft ballast conduits 98 through suitable power operated valves 130, ballast conduits 98 being arranged in parallel at opposite ends of main conduit 128. With valves 110, 122, 124, and 130 open, the four ballast compartments at the fore and aft portions of each hull may be ballasted with sea water at an equal rate to maintain the platform substantially level when the vessel is being partially submerged to a high draft column stabilized drilling level or position.

To refloat the vessel with the hulls 12 having freeboard, valve 110 is closed and valves 112, 130, and 132 are opened. Pumps 114 and 116 operate to pump water in the same direction as before and accordingly suction main conduit 128 through conduit 134, thereby suctioning ballast conduits 98 and withdrawing ballast water therefrom for discharge through conduit 126, open valve 112 and outlet 108. It is thus readily seen that by selective operation of valves 110, 112, and 130, and 132, selected compartments of compartments 96 may be ballasted and deballasted as desired to affect the attitude of the vessel about heel and trim axes, and to assist in the drilling operation. Moreover, this can be accomplished when the vessel is in any operating condition, i.e., low draft floating with the hulls having freeboard, high draft column stabilized floating during drilling operations or any intermediate position during submerging or refloating operations.

Conduit 192 connects the port and starboard pumprooms and communicates with ballast conduit 128. By activating the appropriate valves, including valve 190 in conduit 192, ballast can be transferred from one hull to the other. In the event that one pumproom becomes flooded due to extreme damage, the ballasting system can be controlled by opening valve 190 and controlling the ballast system with the pumps in the other hull.

The ballast drilling water conduits 100 are also connected in parallel to the aft end of main conduit 128 through suitable valves 138 similar to valves 130. Thus, the ballast drilling compartments 102 can be ballasted, deballasted, and selectively ballasted and deballasted similarly as compartments 96 by selected operation of valves 138 and the aforementioned valves 110, 112, and 132.

A fresh water intake or filling conduit 140, communicating with the machinery deck via uptake conduit 142, and a fresh water suction conduit 144, communicating with the ship's service fresh water pump 146, each communicate with a fresh water compartment 148 located aft of the pump room on the inboard side of the hull. A conduit 149 communicates between fresh water pump 146 and the machinery deck via uptake conduit 150. A pair of fuel oil suction conduits 152 communicate with fuel oil tank 154 located forward of the pump room on the inboard side of the hull and provides fuel oil to the machinery deck via an uptake conduit 156 by means of fuel pump 158. Drill water is pumped from the aft drilling water compartment 162 and the ballast/-drilling compartments 102 via conduits 164 and 100, 166, respectively, into a main drill water conduit 167 by a pump 168 which delivers the drill water via suitable valve 170 to the machinery deck via an uptake conduit 172. A drill water conduit 174 communicates with the forward drilling water compartment 176 and provides drill water to the machinery deck via pump 168 and conduit 172. Suitable valves 178 are provided in conduits 164 and 166 and these together with valve 176 in conduit 174 are selectively operable to fill and suction compartments 102, 162 and 176, whereby drill water may be transferred to and from the drilling rig and may be employed for the purposes of ballasting and deballasting the vessel.

It is a significant feature of the present invention that vessel 10 can be towed between drilling sites at speeds on the order of 10–12 knots providing the present vessel with a mobility heretofore unavailable in prior semisubmersible type platforms. To this end, hulls 12 have bow, stern and midbody designs and have a displacement when deballasted to support the entire weight of the vessel in a low draft floating condition with the hulls 12 having freeboard. In this low draft floating condition, it will be noted that the mast 46 is pivoted to extend horizontally as seen in FIG. 1, thereby lowering the overall center of gravity of the vessel, wind resistance, and excessive dynamic loading on the mast 46. Thus, when floating with the twin hulls having freeboard, vessel 10 has the greater righting stability and decreased roll angles characteristic of a catamaran type vessel. It will be seen that the support structure for platform 20 including truss formations 22 and stabilizing columns 24, are disposed above the waterline and accordingly do not present a frontal area to the water to offer resistance to passage therethrough. In the low draft floating condition, only twin hulls 12 displace water and the hydrodynamic characteristics of the hulls, particularly their substantially streamline shape as well as the absence of support structure in contact with the water, minimizes their resistance to passage through the water and permit the towing of the vessel at significantly higher speeds than theretofore possible with prior semisubmersible platforms.

When vessel 10 reaches the drilling site, the anchors (not shown) and anchor lines 80 are deployed to maintain the vessel directly over the drilling site. Hulls 12 are then ballasted preferably by simultaneously ballasting fore and aft compartments 96 thereby maintaining the vessel level, to submerge the hulls below the water line with the vessel being submerged to the extent that columns 24 are partially submerged for approximately half their effective height h, thereby locating the mean water line above the upper surfaces of the hulls at a distance of approximately half the distance between platform 20 and the upper surface of hulls 12. In this manner, the maximum anticipated wave is prevented from acting against hulls 12 and platform 20 and acts only in the open frame area between the hulls and the platform; this reduces the adverse effect of wave action on the vessel which has excellent motion minimizing characteristics in the column stabilized high draft floating condition. As the vessel is partially submerged, anchor lines 80 are made taut by operation of winches 78 to maintain the vessel over the drilling site.

Figure 2:
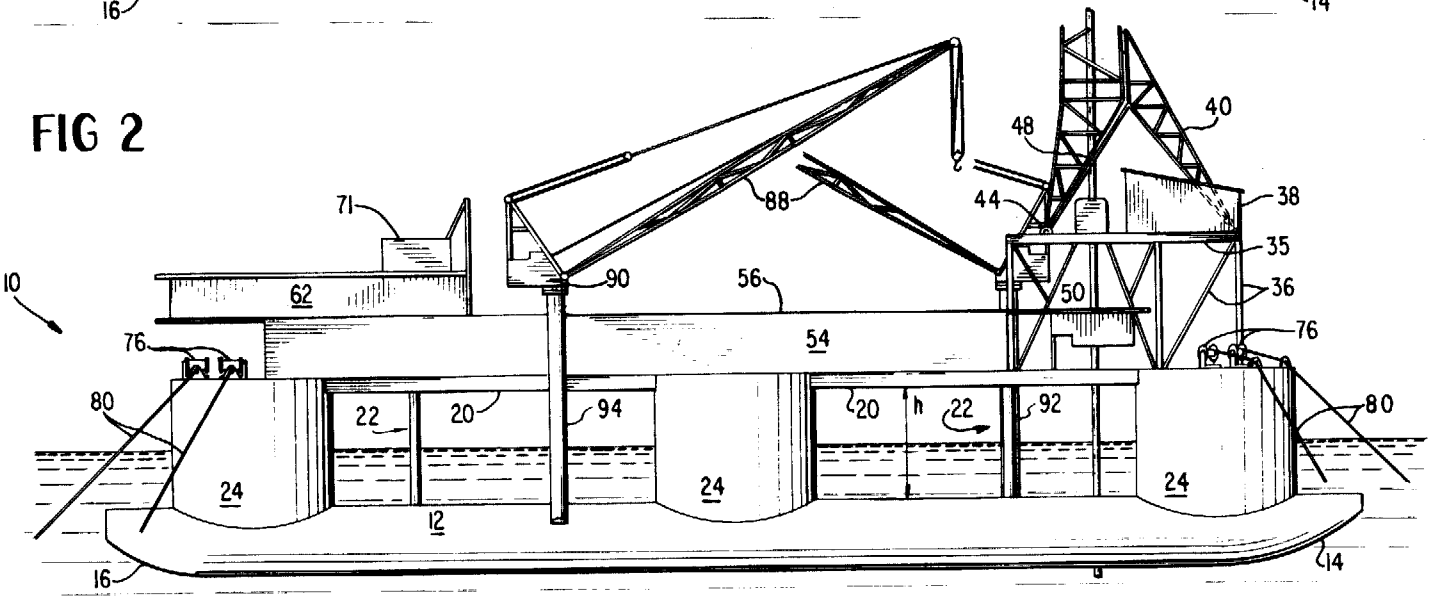
FIG. 2 is a side elevational view of the vessel similar to that of FIG. 1 and illustrating the vessel in the high draft, column stabilized, floating condition.

At the predetermined submerged depth, valves 130 are closed and the displacement of the submerged portions of columns 24 and the residual displacement of the hulls are sufficient to maintain the vessel in the floating high draft condition. It is a significant feature hereof that the foregoing vessel has optimal stability characteristics in the floating high draft condition. To this end, the columns are designed to provide a sufficiently large displacement of the submerged portions thereof and this, in combination with the displacement of the submerged hull, provides sufficient overall buoyancy to support the entire weight of the vessel including the drilling rig, crew's quarters, etc., in the floating high draft condition as well as a sufficiently large water plane area at the aforementioned depths of submergence to provide an adequate righting moment arm to return the vessel to a level position. The columns are also designed to provide a sufficiently small displacement of the submerged portions thereof to preclude large amplitudes of the vessel displacement in heave and *a* sufficiently small water plane area to provide a longer period of and hence a gentle roll. The columns provide a roll sufficiently slow as to preclude tossing about of operating personnel, equipment and machinery on platform 20 (which as seen in FIG. 2 are at a considerable height above the roll axis RA when the vessel is in the high draft condition) and a roll rate sufficiently fast to provide adequate stability about the roll axis. The vessel attitude about heel and trim axes can be corrected by selected ballasting of compartments 96, and, if necessary, compartments 102.

Particularly, to afford motion minimizing characteristics [ of ] *to* the vessel within the designed constraints imposed on the vessel, such as width limitations to permit passage through the Panama Canal, the operating parameters, for example, the drilling rig, deck load, etc., the cross sectional area and configuration of the columns, the weight distribution of the vessel, and the geometry of the submerged hulls and portions of the hulls to platform connections specifically the submerged column portions are such as to maintain the natural period of the vessel in the high draft condition at least as great as six seconds and are preferably such that the natural period of the vessel in the high draft condition lies within a range of 6 to 40 seconds.

It will be noted that the primary purpose of the present variable draft vessel is to minimize vessel motion due to wave action, particularly when operating in the high draft column stabilized condition. Ideally, this is accomplished by submerging the vessel approximately one-half the effective heights of columns 26 thus precluding wave action against the platform as well as the hulls so that only the exposd columns 24 and trusses 22 between the platform and hulls are exposed to wave action. However, even when this vessel is operating within design limits in the high draft column stabilized condition with the motion-minimizing characteristics afforded by the described vessel construction, there is some vessel response to wave action, i.e., the wave action against columns 24 and the other support structure including trusses 22. Because of this, when the period of the waves according to existent sea conditions is close to the natural period of the vessel, there may be amplification of vessel motion which may become so excessive as to interfere with drilling and other operations, even though the vessel is submerged to the usual operating condition with the mean water line at approximately one-half the effective height h of stabilizing columns 24. It is thus necessary and desirous to alter the motion of the vessel when such motion amplification occurs and this can be accomplished by either ballasting or deballasting within certain predetermined limits to vary the draft of the vessel to a greater or lesser extent from the ideal column stabilized high draft condition which locates the mean water surface one-half the effective height h. The maximum variation of vessel draft from the ideal draft in column-stabilized floating condition by ballasting or deballasting the vessel is, however, limited to distances within a range which do not reorient the vessel to a position wherein wave action against the vessel causes excessive impact. Thus, to preclude excessive vessel motion and impact caused by the interaction of vessel and wave motion, the maximum variation in draft in the column stabilized floating condition, i.e., by ballasting or deballasting, from the ideal column-stabilized draft of one-half h, is such that the distance between mean water surface and either the underside of the platform or the topside of hulls 12 is not less than 0.75 of the existent mean wave height.

In addition to ballasting and deballasting, the natural period of the vessel in pitch and roll may be varied by redistribution of the ballast within the vessel. This can be accomplished through ballast transfer between compartments, toward or away from the ship's extremities, as the conditions may necessitate, i.e., transversely or longitudinally of the vessel. In this manner, all vessel motions caused by wave action can be minimized and the stability and motion minimizing characteristics thus afforded the vessel are optimum for a vessel of the foregoing construction.

To refloat the vessel, the anchor lines are loosened or the anchors are shipped aboard the vessel and ballast compartments 96 and/or compartments 102 are pumped to evacuate the water therein as hereinbefore described. The combined displacement of the hulls and the submerged columns is sufficient to raise the vessel to the low draft floating condition illustrated in FIG. 1, the stabilizing columns acting continuously to stabilize the vessel during refloating operations.

In either floating condition, the stability characteristics of the twin hull vessel afford use thereof as a tender with one or both of cranes 84 and 86 being operable to service another drilling rig or vessel. The vessel is self-contained in that crews quarters, the required auxiliary equipment, and deck load, etc., is on board and accordingly the vessel can provide these facilities to service another drilling structure. Auxiliary equipment, crews quarters, etc. may be located within columns 24 in addition to being located on platform 20.

Certain basic principles are employed in the construction of the present vessel:

(1) A pair of elongated, laterally spaced hulls 12, having bow, stern and midbody designs and lying in substantially parallel relation, are employed to provide greater towing speeds as well as high stability.

(2) The hulls have sufficient displacement to float the vessel with the hulls having freeboard, and the hulls are compartmented for ballasting in a predetermined volumetric relation to the stabilizing columns 24 as noted in points (6) and (7) hereafter.

(3a) The vessel should have at least six stabilizing columns 24, with half of the columns being disposed on each hull on opposite sides of the roll axis RA and a first and second pair of such columns on opposite sides of the pitch axis PA (passing through the center of the flotation) with the third middle pair of such columns located adjacent or intersected by the pitch axis when a total of six stabilizing columns are used.

(3b) More specifically, if an odd number of pairs of stabilizing columns are employed, the middle pair should be adjacent the pitch axis PA and the other pairs of columns should be disposed in equal numbers on opposite sides of the pitch axis PA and in a generally symmetrical relation, as illustrated, for example, in FIG. 4; whereas when an even number of pairs of stabilizing columns are employed, the same number of pairs are located on the opposite sides of the pitch axis PA in a generally symmetrical relation thereto, as illustrated for example in FIGS. 10A and 10B.

(4) To stabilize the vessel, each of columns 24 should have a predetermined area which is constant in cross section throughout the effective height thereof per point (6) below.

(5) The platform or main deck is supported above the upper surfaces of the hulls a predetermined height h which is at least equal to and preferably slightly greater than the maximum anticipated wave height, i.e., the vertical distance between wave crest and trough.

(6) The effective height of the stabilizing columns is equal to and preferably slightly greater than the maximum anticipated wave height from crest to trough such height being substantially unaffected by any slight changes in configuration for the mechanical connection between the columns and either of the hulls and platform.

(7) The stabilizing columns 24 are constructed so that their lower portions having a height equal to one-half the effective height provide a combined displacement together with the residual displacement of ballasted hulls 12 so as to float the vessel in a [ height ] *high* draft condition meeting the requisites of point (6).

(8) When floating in the high draft condition, the stabilizing columns provide stabilizing righting moments about the roll axis RA and the pitch axis PA in proportion to their volumetric displacement, cross sectional area and their respective distances from each such axes, whereby such righting stabilizing moments are of a magnitude to maintain the vessel within optimum limits of roll and/or pitch inclination and period of roll and/or pitch for drilling operations.

(9) The vessel is ballasted to a partial submergence of approximately one-half the effective height of the stabilizing columns to maintain the vessel in a high draft floating condition. To minimize vessel motion amplification under such conditions when necessary, ballast is redistributed and/or the vessel is ballasted to submerge or emerge to a greater or lesser extent from the above optimum high draft condition such that the distance between the mean water surface and either the underside of the deck of top side of the hull is not less than 0.75 of the mean wave height.

(10) The cross sectional area and configuration of the columns, the weight distribution of the vessel, and the geometry of the sumberged hulls and portions of the columns are such as to maintain the natural period of the vessel in the high draft condition at least as great as six seconds and preferably such that the natural period of the vessel in the high draft column stabilized condition lies within a range of 6 to 40 seconds.

An illustrative preferred embodiment of a vessel constructed according to the present invention has an overall length of 270 feet at hulls 12 with each hull 12 having a beam of 30 feet and inside spacing of 30 feet from each other, providing an overall hull beam of 90 feet. The effective height h of the stabilizing columns 24 is 24 feet. The centroids of the columns 24 are equally spaced 41½ feet from the vessel's longitudinal centerline. The pairs of outer stabilizing columns 24 are spaced about 212 feet apart, with the central pair of columns 24 being midway between. The length and width of the columns 24 are 34 feet and [ 23 ] *32* feet respectively with the ends being formed cylindrical in shape providing an overall area of approximately 667.5 square feet. To provide a larger righting moment about the roll axis RA, the bottles 24 preferably overhang 8 feet beyond the outboard hull sides providing an overall vessel beam of 106 feet, and, accordingly, an overall length-to-width ratio of approximately 2½:1 is provided.

SUMMARY OF CONSTRUCTION AND OPERATION

Thus, the present invention provides a twin hull, variable draft column stabilized drilling platform having a plurality of connecting members including spaced upstanding stabilizing columns 24 which are fixed at their lower ends to a pair of laterally spaced, elongated parallel hulls 12 and which support a drilling platform 20 including crew's quarters and machinery spaces, at their upper ends. The spaced hulls are compartmented to provide ballast tanks 96 which are deballasted when the vessel is towed to and from drilling sites to provide sufficient hull displacement to support the vessel (and its drilling rig, crew's quarters and machinery spaces) in low draft condition with the hulls having freeboard. The hull compartments 96 provide a safety factor in the event of a collision or otherwise rupturing certain of the compartments. At the drilling site, the hulls' ballast tanks 96 and tanks 102, if necessary, are ballasted to submerge the hulls normally to a distance about one-half the effective height of stabilizing columns 24 which is about one-half the height of the maximum anticipated wave whereby platform 20 remains supported above the maximum anticipated wave height. The displacement required to support the platform/barge in the high draft floating condition is provided by the submerged hulls and portions of the stabilizing columns 24, the vessel in this condition being otherwise unsupported. The present vessel is thus different from the previously discussed prior types of self-contained fixed platform, self-elevating barges and surface floating vessels as the present vessel operates in two distinct conditions (1) low draft floating with the hulls having freeboard and (2) high draft column stabilized floating; thus, the vessel involves stability and structural criteria differing from the abovementioned prior type vessels or fixed platforms. The present vessel of this invention is further distinguished from such prior type vessels in that sole support in both conditions is provided by buoyancy whereby factors for ground supported operation are not involved.

Moreover, the present vessel is also significantly different in concept, construction and mode of operation from previously described semisubmersible platforms as will now be discussed. Mobility between and stability at the drilling sites are prime requisites for an effective drilling vessel. The vessel of this invention can be towed between drilling sites at speeds greatly in excess of towing speeds for prior drilling platforms and the like, due to use of twin hulls having sufficient displacement to locate the stabilizing columns 24 above the waterline when the vessel is in the floating condition and hulls having stern, bow and midbody designs characterized by hydrodynamic and hydrostatic properties. Contrary to the provision of interconnecting base structure at the lower ends of polygonally located stabilizing columns as in prior art semisubmersibles, whereby the base structure creates significant drag when those semisubmersibles are towed on the water surface so that towing speeds are limited to about two knots, the streamlined parallel twin hulls 12 of the present vessel are interconnected only above the waterline when the vessel is in the freeboard low draft floating condition thus enabling significantly greater towing speeds of about 10–12 knots and thereby greatly reducing the time in transit between drilling sites. Moreover, by utilizing twin streamlined parallel hulls 12, the overall beam of the present vessel is significantly less than the width of prior equilateral symmetrical polygonally shaped semisubmersible vessels, while the present vessel can support a corresponding weight in drilling platform, machinery, and equipment. Further, this construction enables the present vessel to be towed through narrow waterways such as the Suez and Panama Canals, while previous polygonally shaped semisubmersibles could not. Additionally, the twin hulls feature hereof provides high stability in the freeboard low draft floating condition notwithstanding the relatively high locus of the center of gravity of the overall vessel necessitated by spacing the drilling platform, machinery and equipment at an effective height above the hulls based on the anticipated sea states in which the vessel will operate, as hereinafter more fully discussed.

The ability of the present vessel to provide a stable floating platform in various wave conditions without recourse to the symmetrical equilateral polygonally shaped structures of prior semisubmersibles heretofore thought necessary to stabilize the same in a floating column stabilized condition, is highly significant as it permits use of the above-described twin hull support, thus combining in a single vessel the desirable stability characteristics of a twin hulled low draft vessel having freeboard and a column stabilized high draft vessel and drilling platform. To stabilize the present vessel and its drilling platform 20 in the floating high draft condition, wave action against the vessel must be minimized as a cause of unfavorable motion characteristics. By submerging the twin hulls such that the platform and upper surfaces of the hulls are respectively spaced above and below the waterline a distance at least equal to one-half the maximum anticipated wave or to half the effective height of columns 24, wave action against the larger surface area of hulls 12 or the drilling platform is substantially eliminated, and waves act only against the relatively small area of open support structure and framework between the drilling platform and the hulls. The location, size and configuration of the vessel's stabilizing columns 24 are effective: to maintain the vessel in a buoyant high draft condition; to locate and maintain the drilling platform 20 and hulls 12 respectively above and below the maximum wave amplitude; to preclude large vessel motions in heave due to large column displacement and the inertial properties of the vessel; to provide a sufficient righting moment when unstabilized about roll and pitch axes of a magnitude to correct the rolling and pitching motion; and to generally minimize the effect of the wave action against the vessel when in the floating high draft condition.

The stabilizing columns 24 are located adjacent opposite end portions of each hull with an additional column located on or adjacent the transverse axis through the center of flotation to provide moment arms about roll and pitch axes such that the hydrodynamic forces act to establish righting moments in the high draft condition proportional to the volumetric displacement of the submerged portions of the stabilizing columns about the roll and pitch axes to locate and maintain the metacenter above the center of gravity of the vessel for all floating high draft positions of the vessel. It may be noted at this point that the width of the twin hulled vessel imposes a restriction on the moment of inertia developed about the roll axis as the transverse distance of stabilizing columns 24 along each hull from the centerline of the vessel is limited to one-half the width of the vessel. The stabilizing columns 24 are therefore provided with water plane areas sufficiently large to compensate for the smaller moment arm in the transverse direction, and a preferred form of the vessel has the stabilizing columns located as close to the outboard sides of the hulls as possible, and in the illustrated embodiment portions of the columns are outboard of the hulls to further increase this righting arm.

While the preferred form of the vessel described herein provides three or an odd number of pairs of columns, an even number of pairs of columns can be provided, four pairs 24 thereof being illustrated in the embodiments of the present vessel shown in FIGS. 10A–10B. It is seen, in this embodiment, that a like number of pairs of columns 24 are disposed on opposite sides of the transverse pitch axis PA and in a generally symmetrical relation thereabout, the middle pairs of columns thereof being spaced on opposite sides of the pitch axis PA.

The effective height of the stabilizing columns from the upper surfaces of the twin hulls to the under surface of the platform may be equal to and preferably slightly greater than the height of the maximum anticipated wave such that in the floating high draft condition, the hulls remain underwater and the platform above water for all waves. The stabilizing columns 24 also have a shape providing a constant cross sectional area throughout their effective height, thus presenting constant water plane areas to the water surface. Thus, submergence and emergence of stabilizing columns 24 due to wave action act to stabilize the vessel at a gentle stabilizing rate. If the cross sectional area of the upper half of stabilizing columns 24 were progressively increased in the upward direction, a shortened and undesirable roll and pitch period could occur with adverse effect on the drilling operation; and a progressive decrease in the cross sectional area of the upper half of the stabilizing columns 24 would result in large undersirable roll and pitch angles.

The magnitude of the cross sectional areas and hence the water plane areas and displacement of the present stabilizing columns is determined in part by the magnitude of the displacement of the hulls and satisfaction of other counter-vailing criteria. A sufficiently large column or bottle displacement is provided to afford adequate buoyancy to support the vessel in the high draft condition with the hulls ballasted and providing a small proportion of total displacement. Sufficient water plane areas are provided for the columns to insure an adequate righting moment about roll and pitch axes with the roll and pitch angles not exceeding optimum limits. The column or bottle displacement, however, is sufficiently small so that large vessel displacements in heave are avoided. Additionally, the water plane areas are small enough to provide a period of roll which provides safe and comfortable operating conditions. The reduced water plane area also generally minimizes the wave action against the vessel.

A crane 84 is located adjacent one side of the raised platform to service the self-contained drilling rig. A second crane 86 is preferably also provided on the opposite side of the vessel for like purpose.

The twin hull stability of the present vessel is great enough to enable the vessel to carry heavy deck loads. When employed as a tender barge, one of the small cranes 84 or 86 will be eliminated and a heavy duty crane (e.g., 150 ton lift capacity) would be substituted; this crane would preferably be mounted on one of the center columns 24 to utilize the column for structural support. In this usage, not only does ballasting the hulls submerge the vessel to provide a stable platform for drilling operations but also the hull compartments 96 can be selectively ballasted to correct the vessel heel and trim, respectively, to offset the weight of, and variations in, loads applied to the vessel via the crane. Further, the ballast correction can be applied to the vessel in both the high and low draft conditions.

It will be appreciated that the foregoing described vessel may be employed in other types of marine operations and fitted out with suitable structure consonant with such employment. For example, instead of mounting a drilling rig on platform 38, the column stabilized vessel of this invention may be adapted as a heavy duty derrick barge by mounting a heavy duty crane thereon along the centerline of the vessel, with other portions of the vessel being constructed similarly to corresponding portions of the vessel herein described and illustrated, with appropriate modification as to size. This vessel can be used as a dredge vessel by mounting and operating standard dredging equipment taking advantage of all the motion minimizing characteristics of the foregoing described vessel.

It is therefore seen that the objects of the present invention are fully accomplished in that the present vessel provides a deep water drilling unit having rapid mobility in transit between drilling sites as well as an exceedingly stable structure when in high draft condition at drilling depths over a drill site. Moreover, the vessel provides for a self-contained drilling operation or as a tender servicing other drilling structures.

This invention may be embodied in other specific forms without departing from the spirit or essential characteristics thereof.

What is claimed and desired to be secured by United States Letters Patent is:

1. A variable draft vessel comprising:

a pair of elongated hulls disposed in side-by-side spaced substantially parallel relation one to the other;

a working platform;

means connected to said hulls and said platform to support said platform in spaced relation above said hulls;

said connecting means including at least six upstanding stabilizing columns disposed on said hulls, a pair of said columns being located adjacent opposite ends of said hulls on opposite sides of the pitch axis of the vessel, at least three columns being located on each hull and on opposite sides of the roll axis of the vessel;

said hulls having a combined displacement sufficient to float the vessel in a low draft condition with the hulls having freeboard;

and means for ballasting and deballasting the vessel to respectively submerge the hulls and portions of said connecting means below said platform below the waterline thereby to provide a high draft condition and refloat the vessel with the hulls having freeboard, the displacement of the submerged hulls and portions of said connecting means being sufficient to maintain the vessel buoyant in the high draft condition;

said connecting means being spaced one from the other to provide an open frame area between the components thereof and between said platform and said hulls;

the cross sectional area and configuration of said columns, the weight distribution of the vessel, and the geometry of the submerged hulls and portions of said connecting means being such as to maintain the natural period of the vessel in the high draft condition no less than six seconds;

said vessel having a length to width ratio of at least 2 to 1;

said stabilizing columns being connected to said hulls on the outboard sides thereof with the distance between the pitch axis and the centroid of the stabilizing columns on opposite sides of the pitch axis being greater than the transverse distance between the roll axis and the centroid of the stabilizing columns on opposite sides of the roll axis, said stabilizing columns having outboard portions thereof which extend transversely beyond the outboard sides of the respective hulls thereby providing increased moment for stabilizing action about the roll axis.

2. A variable draft vessel comprising:

a pair of elongated hulls disposed in side-by-side spaced substantially parallel relation one to the other;

a working platform;

means connected to said hulls and said platform to support said platform in spaced relation above said hulls; said connecting means including at least four stabilizing columns located on said hulls with a pair of said columns on each of the opposite sides of the respective pitch and roll axes of the vessel;

said hulls having a combined displacement sufficient to float the vessel in a low draft condition with the hulls having freeboard;

and means for ballasting and deballasting the vessel to respectively submerge the hulls and portions of said connecting means below said platform below the waterline thereby to provide a high draft condition and refloat the vessel with the hulls having freeboard, the displacement of the submerged hulls and portions of said connecting means being sufficient to maintain the vessel buoyant in the high draft condition;

said connecting means being spaced one from the other to provide an open frame area between the components thereof, and between said hulls and said platform;

the cross sectional area and configuration of the columns, the weight distribution of the vessel, and the geometry of the submerged hulls and portions of said connecting means being such as to maintain the natural period of the vessel in the high draft condition no less than 6 seconds; said stabilizing columns being connected to said hulls on the outboard sides thereof with the distance between the pitch axis and the centroid of the stabilizing columns on opposite sides of the pitch axis being greater than the transverse distance between the roll axis to the centroid of the stabilizing columns on opposite sides of the roll axis, said stabilizing columns having outboard portions thereof which extend transversely beyond the outboard sides of the respective hulls thereby providing increased moment for stabilizing action about the roll axis.

3. A variable draft vessel comprising:

a pair of elongated hulls disposed-in side-by-side spaced substantially parallel relation one to the other;

a working platform;

a plurality of elements upstanding from said hulls with at least a portion of said elements being connected to said platform to support the platform in spaced relation above the hulls a predetermined height at least equal to the height of the maximum anticipated wave; at least a portion of said upstanding elements including at least six stabilizing columns disposed on said hulls and upstanding therefrom a predetermined effective height at least equal to the height of the maximum anticipated wave, a pair of said columns being located adjacent opposite ends of said hulls on opposite sides of the pitch axis of the vessel, at least three columns being located on each hull and on opposite sides of the roll axis of the vessel;

said hulls having a combined displacement sufficient to float the vessel in a low draft condition with the hulls having freeboard;

and means for ballasting and deballasting the vessel to respectively submerge the hulls and portions of said elements below the waterline thereby to provide a high draft condition and refloat the vessel with the hulls having freeboard, the displacement of the submerged hulls and portions of said elements being sufficient to maintain the vessel buoyant in the high draft condition;

said elements being spaced one from the other to provide an open frame area therebetween and between said platform and hulls;

the cross sectional area and configuration of the columns, the weight distribution of the vessel and the geometry of the submerged hulls and portions of said elements being such as to maintain the natural period of the vessel in the high draft condition no less than 6 seconds;

said vessel having a length to width ratio of at least 2 and 1;

the displacement of the submerged hulls and portions of said elements being sufficient to maintain the vessel buoyant in the high draft condition with the mean waterline located a distance above the hulls at substantially one-half the effective height of said stabilizing columns;

said stabilizing columns being connected to said hulls on the outboard sides thereof with the distance between the pitch axis and the centroid of the stabilizing columns on opposite sides of the pitch axis being greater than the transverse distance between the roll axis and the centroid of the stabilizing columns on opposite sides of the roll axis, said stabilizing columns having outboard portions thereof which extend transversely beyond the outboard sides of the respective hulls thereby providing increased moment for stabilizing action about the roll axis.

4. A variable draft vessel comprising: no more than two hulls disposed in side-by-side spaced substantially parallel relation one to the other;

a working platform;

means connected to said hulls and said platform to support said platform in spaced relation above said hulls a predetermined height at least equal to the height of the maximum anticipated wave, said connecting means including at least six upstanding stabilizing columns disposed on said hulls and upstanding therefrom a predetermined effective height of at least equal to the height of the maximum anticipated wave, a pair of said columns being located adjacent opposite ends of said hulls on opposite sides of the pitch axis of the vessel, at least three columns being located on each hull and on opposite sides of the roll axis of the vessel;

said hulls having a combined displacement sufficient to float the vessel in a low draft condition with the hulls having freeboard;

and means for ballasting and deballasting the vessel to respectively submerge the hulls and portions of the connecting means below said platform below the waterline thereby to provide a high draft condition and refloat the vessel with the hulls having freeboard, the displacement of the submerged hulls and portions of said connecting means being sufficient to maintain the vessel buoyant in the high draft condition;

said connecting means being spaced one from the other to provide an open frame area between the components thereof and between said platform and said hulls;

said vessel having a length to width ratio of at least 2 to 1;

said stabilizing columns being connected to said hulls on the outboard sides thereof with the distance between the pitch axis and the centroid of the stabilizing columns on opposite sides of the pitch axis being greater than the transverse distance between the roll axis and the centroid of the stabilizing columns on opposite sides of the roll axis, said stabilizing columns having outboard portions thereof which extend transversely beyond the outboard sides of the respective hulls thereby providing increased moment for stabilizing action about the roll axis.

5. A variable draft vessel comprising:

no more than two hulls disposed in side-by-side spaced substantially parallel relation one to the other;

a working platform;

means connected to said hulls and to said platform to support said platform in spaced relation above said hulls a predetermined height at least equal to the height of the maximum anticipated wave, said connecting means including at last six upstanding stabilizing columns disposed on said hulls and upstanding therefrom a predetermined effective height at least equal to the height of the maximum anticipated wave, a pair of said columns being located adjacent opposite ends of said hulls on opposite sides of the pitch axis of the vessel, at least three columns being located on each hull and on opposite sides of the roll axis of the vessel with the cross sectional area of said columns being substantially constant throughout the effective height thereof;

said hulls having a combined displacement sufficient to float the vessel in a low draft condition with the hulls having freeboard;

and means for ballasting and deballasting the vessel to respectively submerge the hulls and portions of said connecting means below the waterline thereby to provide a high draft condition and refloat the vessel with the hulls having freeboard, the displacement of the submerged hulls and portions of said connecting means being sufficient to maintain the vessel buoyant in the high draft condition with the mean waterline located a distance above the hulls at substantially one-half the effective height of said stabilizing columns;

said connecting means being spaced one from the other to provide an open frame area between the components thereof and between said platform and said hulls;

the cross sectional area and configuration of said columns, the weight distribution of the vessel and the geometry of the submerged hulls and portions of said connecting means being such as to maintain the natural period of the vessel in the high draft condition no less than 6 seconds;

said vessel having a length to width ratio of at least 2 to 1;

said stabilizing columns being connected to said hulls on the outboard sides thereof with the distance between the pitch axis and the centroid of the stabilizing columns on opposite sides of the pitch axis being greater than the transverse distance between the roll axis and the centroid of the stabilizing columns on opposite sides of the roll axis, said stabilizing columns having outboard portions thereof which extend transversely beyond the outboard sides of the respective hulls thereby providing increased moment for stabilizing action about the roll axis.

6. A variable draft vessel comprising:

a base structure having hydrostatic and hydrodynamic characteristics;

a working platform;

a plurality of elements upstanding from said base structure with at least a portion of said elements being connected to said platform to support said platform in spaced relation about said base structure, at least a portion of said upstanding elements including at least six stabilizing columns disposed on said base structure with a pair of said columns being located adjacent opposite ends of said base structure on opposite sides of the pitch axis of the vessel, at least three columns being located on said base structure on opposite sides of the roll axis of the vessel;

said base structure having displacement sufficient to float the vessel in a low draft condition with the base structure having freeboard;

and means for ballasting and deballasting the vessel to respectively submerge the base structure and portions of said elements below the waterline thereby to provide a high draft condition and refloat the vessel with the base structure having freeboard;

said elements being spaced one from the other to provide an open frame area therebetween and between said platform and said hulls;

the cross sectional area and configuration of said columns, the weight distribution of the vessel, and the geometry of the submerged base structure and portions of said elements being such as to maintain the natural period of the vessel in the high draft condition no less than 6 seconds;

said vessel having a length to width ratio of at least 2 to 1;

said stabilizing columns being connected to said base structure on the outboard sides thereof with the distance between the pitch axis and the centroid of the stabilizing columns on opposite sides of the pitch axis being greater than the transverse distance between the roll axis and the centroid of the stabilizing columns on opposite sides of the roll axis, said stabilizing columns having outboard portions thereof which extend transversely beyond the outboard sides of the base structure thereby providing increased moment for stabilizing action about the roll axis.

[ 7. A variable draft vessel comprising:

a pair of elongated flotation members disposed in side-by-side spaced substantially parallel relation one to the other;

a working platform;

means connected to said flotation members and said platform to support said platform in fixed spaced relation above said members;

said connecting means including at least six upstanding stablizing columns disposed on said members, a pair of said columns being located adjacent opposite ends of said members on opposite sides of the pitch axis of the vessel, at least three columns being located on each member and on opposite sides of the roll axis of the vessel;

said platform being spaced above said members a predetermined height at least equal to the height of the maximum anticipated wave, said columns upstanding from said members a predetermined effective height at least equal to the height of the maximum anticipated wave, the cross sectional area of said columns being substantially constant throughout the effective height thereof;

said members having a combined displacement sufficient to float the vessel in a low draft condition with the members having freeboard;

means for ballasting and deballasting the vessel to respectively submerge the members and portions of said connecting means below said platform below the waterline thereby to provide a high draft, otherwise unsupported, floating condition and return the vessel to the low draft condition with the members having freeboard, the displacement of the submerged members and portions of said connecting means being sufficient to maintain the vessel buoyant in the high draft floating condition;

said connecting means being spaced one from the other to provide an open frame area between the components thereof and between said platform and said members;

the combined water plane areas of said columns forming at least the major portion of the total water plane area of said vessel in the high draft condition;

the cross sectional area and configuration of said columns, the weight distribution of the vessel, and the geometry of the submerged members and portions of said connecting means being such that the vessel obtains motion minimizing characteristics in the high draft condition;

and means carried by the vessel for conducting drilling operations while the vessel is maintained in the high draft floating condition;

said vessel having a length to width ratio of about 2 to 1.]

[ 8. A vessel according to claim 7 wherein the natural periods in pitch and roll of the vessel in the high draft condition lie within a range of 6 to 40 seconds.]

[ 9. A vessel according to claim 7 wherein the displacement of said submerged members and portions of said connecting means is sufficient to maintain the vessel buoyant in the high draft condition with the mean waterline located a distance above said members at substantially one-half the effective height of said stabilizing columns;

said ballasting and deballasting means being operable to vary the submergence of the vessel when in the high draft condition such that the distance between the mean waterline and either the underside of the platform or the topside of said members is not less than 0.75 of the mean wave height for wave heights less than the maximum anticipated wave to preclude amplification of vessel motion due to interaction of wave and vessel motion.]

[ 10. A vessel according to claim 7 including a stabilizing column on each member located adjacent the transverse axis through the center of flotation of the vessel, said connecting means including a plurality of support members forming trusses extending between said member and said platform at spaced longitudinal positions along the vessel, said trusses including transversely extending elements connecting one member to the other with said elements lying above the uppermost portions of said flotation members.]

[11. A vessel according to claim 7 wherein at least one of said stabilizing columns on each said member has a cross section elongated in a direction substantially parallel to the roll axis of the vessel.]

[12. A vessel according to claim 7 wherein at least one of said stabilizing columns on each said member is substantially oblong in cross section and extends longitudinally parallel to said member a distance greater than its width.]

[13. A vessel according to claim 7 wherein said drilling means includes a drilling rig mounted on said platform over the space between said members.]

[14. A vessel according to claim 7 wherein each of said members has bow and stern designs to minimize resistance to movement through the water in said low draft condition.]

[15. A vessel according to claim 7 wherein the centroids of said columns are transversely spaced from vertical planes containing the longitudinal centerlines of said members.]

[16. A vessel according to claim 7 wherein the centroids of said columns are spaced outboard of vertical planes passing through the longitudinal centerlines of said members.]

[17. A vessel according to claim 7 including a crane for transferring loads between horizontally spaced positions.]

[18. A vessel according to claim 7 wherein said ballasting and deballasting means includes at least two ballast compartments in each of said members, said two ballast compartments being horizontally spaced one from the other, and means for selectively ballasting and deballasting said two compartments in each said member to alter the natural period of said vessel.]

[19. A vessel according to claim 18 wherein said ballasting and deballasting means includes at least four ballast compartments in each of said members, a pair of said ballast compartments in each member being transversely spaced one from the other, another pair of said ballast compartments in each member being longitudinally spaced one from the other and means for effecting ballast transfer into and out of the ballast compartments of each said pair thereof to alter the natural period of said vessel about roll and pitch axes.]

[20. A variable draft vessel comprising: a pair of elongated hulls disposed in side-by-side spaced substantially parallel relation one to the other;

a working platform;

means connected to said hulls and said platform to support said platform in fixed spaced relation above said hulls;

said connecting means including at least four stabilizing columns located on said hulls with a pair of said columns on each of the opposite sides of the respective pitch and roll axes of the vessel;

the cross sectional area of said columns being substantially constant throughout the height thereof;

said hulls having combined displacement sufficient to float the vessel in a low draft condition with the hulls having freeboard, each of said hulls having bow and stern designs to minimize resistance to movement through the water in said low draft condition;

means for ballasting and deballasting the vessel to respectively submerge the hulls and portions of said connecting means below said platform below the waterline thereby to provide a high draft, otherwise unsupported, floating condition and return the vessel to the low draft condition with the hulls having freeboard, the displacement of the submerged hulls and portions of said connecting means being sufficient to maintain the vessel buoyant in the high draft floating condition;

said connecting means being spaced one from the other to provide an open frame area between the components thereof, and between said hulls and said platform;

the combined water plane areas of said columns forming at least the major portion of the total water plane area of said vessel in the high draft condition;

the cross sectional area and configuration of the columns, the weight distribution of the vessel, and the geometry of the submerged hulls and portions of said connecting means being such that the vessel obtains moton minimizing characteristics in the high draft condition;

and means carried by the vessel for conducting drilling operations while the vessel is maintained in the high draft floating condition.]

[21. A vessel according to claim 20 wherein said connecting means includes at least 6 upstanding stabilizing columns disposed on said hulls, a pair of said columns being located adjacent opposite ends of said hulls on the opposite sides of the pitch axis of the vessel, at least 3 columns being located on each hull and on opposite sides of the roll axis of the vessel.]

[22. A vessel according to claim 20 having a length to width ratio of at least 2 to 1.]

[23. A vessel according to claim 20 wherein said platform is spaced above said hulls a predetermined height at least equal to the height of the maximum anticipated wave, said columns upstanding from said hulls a predetermined effective height at least equal to the height of the maximum anticipated wave.]

[24. A vessel according to claim 20 wherein the natural periods in pitch and roll of the vessel in the high draft condition lies within a range of 6 to 40 seconds.]

[25. A vessel according to claim 23 wherein the displacement of said submerged hulls and portions of said connecting means is sufficient to maintain the vessel buoyant in the high draft condition with the mean waterline located a distance above said hulls at substantially one-half the effective height of said stabilizing columns;

said ballasting and deballasting means being operable to vary the submergence of the vessel when in the high draft condition such that the distance between the mean waterline and either the underside of the platform or the topside of said hulls is not less than 0.75 of the mean wave height to preclude amplification of vessel motion due to interaction of wave and vessel motion.]

[26. A vessel according to claim 20 wherein said drilling means includes a drilling rig mounted on said platform over the space between the hulls.]

[27. A vessel according to claim 24 wherein said ballasting and deballasting means include a plurality of compartments in each of said hulls together with means for selectively ballasting and deballasting said compartments.]

[28. A vessel according to claim 20 wherein the centroids of said columns are transversely spaced from vertical planes passing through the longitudinal centerlines of said hulls.]

[29. A vessel according to claim 20 wherein said platform is spaced above said hulls a predetermined effective height at least equal to the height of the maximum anticipated wave, said columns upstanding from said hulls a predetermined effective height at least equal to the height of the maximum anticipated wave, said ballasting and deballasting means including a plurality of compartments in each of said hulls together with means for selectively ballasting and deballasting said compartments, the displacement of the submerged hulls and portions of said connecting means being sufficient to maintain the vessel buoyant in the high draft condition with the mean waterline located a distance above the hulls at substantially one-half the effective height of said stabilizing columns.]

[30. A vessel according to claim 20 wherein said ballasting and deballasting means includes at least two ballast compartments in each of said hulls, said two ballast compartments being horizontally spaced one from the other, and means for selectively ballasting and deballasting said two compartments in each said hull to alter the natural period of said vessel.]

[31. A variable draft vessel comprising: a pair of elongated flotation members disposed in side-by-side spaced substantially parallel relation one to the other;

a working platform;

a plurality of elements upstanding from said members with at least a portion of said elements being connected to said platform to support the platform in spaced relation above the members; at least a portion of said upstanding elements including at least six stabilizing columns disposed on said members and upstanding therefrom a predetermined height, a pair of said columns being located adjacent opposite ends of said members on opposite sides of the pitch axis of the vessel, at least three columns being located on each member and on opposite sides of the roll axis of the vessel;

the cross sectional area of said columns being substantially constant throughout the predetermined height thereof;

said flotation members having a combined displacement sufficient to float the vessel in a low draft condition;

means for ballasting and deballasting the vessel to respectively submerge the members and portions of said elements below the waterline thereby to provide a high draft, otherwise unsupported, floating condition and return the vessel to a low draft condition; the displacement of the submerged members and portions of said elements being sufficient to maintain the vessel buoyant in the high draft floating condition;

said elements being spaced one from the other to provide an open frame area therebetween and between said platform and members;

the combined water plane areas of said columns forming at least the major portion of the total water plane area of said vessel in the high draft condition;

the cross sectional area and configuration of the columns, the weight distribution of the vessel and the geometry of the submerged members and portions of said elements being such that the vessel obtains motion minimizing characteristics in the high draft condition;

and means carried by the vessel for conducting drilling operations while the vessel is maintained in the high draft floating condition;

said vessel having a length to width ratio of at least 2 to 1.]

[32. A vessel according to claim 31 including a crane for transferrng loads between horizontally spaced positions.]

[33. A vessel according to claim 31 wherein the displacement of the submerged members and portions of said elements is sufficient to maintain the vessel buoyant in the high draft condition with the mean waterline located a distance above the members at substantially one-half the predetermined height of said stabilizing columns.]

[34. A vessel according to claim 31 wherein the natural periods in pitch and roll of the vessel in the high draft condition lie within a range of 6 to 40 seconds.]

[35. A vessel according to claim 33 wherein said columns upstand from said members a predetermined height at least equal to the height of the maximum anticipated wave; said ballasting and deballasting means being operable to vary the submergence of the vessel when in the high draft condition such that the distance between the mean waterline and either the underside of the platform or the topside of said members is not less than 0.75 of the mean wave height for wave heights less than the maximum anticipated wave to preclude amplification of vessel motion due to interaction of wave and vessel motion.]

[36. A vessel according to claim 33 including a stabilizing column on each member located adjacent the transverse axis through the center of flotation of the vessel, said connecting means including a plurality of trusses extending between said members and said platform at spaced longitudinal positions along the vessel, said trusses including transversely extending elements connecting one member to the other with said elements lying adjacent the uppermost portions of said members.]

[37. A vessel according to claim 31 wherein at least one of said stabilizing columns on each said member has a cross section elongated in a direction substantially parallel to the roll axis of the vessel.]

[38. A vessel according to claim 37 wherein the centroid of said one stabilizing column on each said member is spaced outboard of the vertical plane containing the longitudinal centerline of the corresponding member.]

[39. A vessel according to claim 31 wherein the members have freeboard in the low draft condition of the vessel.]

[40. A vessel according to claim 31 wherein said platform is fixed in spaced relation above said members each of said members having bow and stern designs to minimize resistance to movement through the water in said low draft condition.]

[41. A vessel according to claim 31 wherein said ballasting and deballasting means includes at least two ballast compartments in each of said members, said two ballast compartments being horizontally spaced one from the other, and means for selectively ballasting and deballasting said two compartments in each said member to alter the natural period of said vessel.]

[42. A variable draft vessel comprising: no more than two hulls disposed in side-by-side spaced substantially parallel relation one to the other;

a working platform;

means connected to said hulls and said platform to support said platform in spaced relation above said hulls, said connecting means including at least six upstanding stabilizing columns disposed on said hulls and upstanding therefrom a predetermined effective height, a pair of said columns being located adjacent opposite ends of said hulls on opposite sides of the pitch axis of the vessel, at least three columns being located on each hull and on opposite sides of the roll axis of the vessel;

said hulls having a combined displacement sufficient to float the vessel in a low draft condition with the hulls having freeboard;

the cross sectional area of said columns being substantially constant throughout the effective height thereof;

means for ballasting and deballasting the vessel to respectively submerge the hulls and portions of the connecting means below said platform below the waterline thereby to provide a high draft, otherwise unsupported, floating condition and return the vessel to the low draft condition with the hulls having freeboard, the displacement of the submerged hulls and portions of said connecting means being sufficient to maintain the vessel buoyant in the high draft floating condition;

said connecting means being spaced one from the other to provide an open frame area between the components thereof and between said platform and said hulls;

the combined water plane areas of said columns forming at least the major portion of the total water plane area of said vessel in the high draft condition;

and means carried by the vessel for conducting drilling operations while the vessel is maintained in the high draft floating condition;

said vessel having a length to width ratio of at least 2 to 1.]

[43. A vessel according to claim 42 including a crane for transferring loads between horizontally spaced positions.]

[44. A vessel according to claim 42 wherein the displacement of the submerged hulls and portions of said connecting means is sufficient to maintain the vessel in the high draft condition with the mean waterline located a distance above the hulls at substantially one-half the effective height of said stabilizing columns.]

[45. A vessel according to claim 42 wherein the cross sectional area and configuration of the columns, the weight distribution of the vessel and the geometry of the submerged hulls and portions of said connecting means are such that the vessel obtains a natural period in the high draft condition no less than 6 seconds.]

[46. A vessel according to claim 44 wherein said ballasting and deballasting means is operable to vary the submergence of the vessel when in the high draft condition such that the distance between the mean waterline and either the underside of the platform or the topside of said hulls is not less than 0.75 of the mean wave height for wave heights less than the maximum anticipated wave to preclude amplification of vessel motion due to interaction of wave and vessel motion.]

[47. A vessel according to claim 42 wherein said stabilizing columns are substantially oblong in cross section and extend longitudinally parallel to said hulls a distance greater than their width.]

[48. A vessel according to claim 42 wherein said drilling means includes a drilling rig mounted on said platform over the space between the hulls.]

[49. A vessel according to claim 42 wherein said platform is fixed in spaced relation above said hulls, each of said hulls having bow and stern designs to minimize resistance to movement through the water in said low draft condition.]

[50. A vessel according to claim 42 wherein said ballasting and deballasting means includes at least two ballast compartments in each of said hulls, said two ballast compartments being horizontally spaced one from the other, and means for selectively ballasting and deballasting said two compartments in each said hull to alter the natural period of said vessel.]

[51. A vessel according to claim 42 wherein the cross sectional area and configuration of said columns, the weight distribution of the vessel and the geometry of the submerged hulls and portions of said connecting means being such as to provide motion minimizing characteristics to the vessel.]

[52. A variable draft vessel comprising: a base structure having hydrostatic and hydrodrynamic characteristics;

a working platform;

a plurality of elements carried by said base structure with at least a portion of said elements upstanding therefrom and being connected to said platform to support said platform in spaced relation above said base structure, at least a portion of said elements including at least four stabilizing columns carried by said base structure and extending vertically a predetermined effective height between generally horizontal planes containing said platform and said base structure, a pair of said columns being located adjacent opposite ends of said base structure on opposite sides of the pitch axis of the vessel, at least two columns being located on opposite sides of the roll axis of the vessel;

the cross sectional area of said columns being substantially constant throughout the effective height thereof;

said base structure having a displacement sufficient to float the vessel in a low draft condition with the base structure having freeboard;

means for ballasting and deballasting the vessel to respectively submerge the base structure and portions of said elements below the waterline thereby to provide a high draft, otherwise unsupported, floating condition and return the vessel to the low draft condition with the base structure having freeboard;

said elements being spaced one from the other to provide an open frame area therebetween and between said platform and said base structure;

the combined water plane areas of said columns forming at least the major portion of the total water plane area of said vessel in the high draft condition;

the cross sectional areas and configuration of said columns, the weight distribution of the vessel, and the geometry of the submerged base structure and portions of said elements being such that the vessel obtains a natural period in the high draft condition no less than 6 seconds;

and means carried by the vessel for conducting drilling operations while the vessel is maintained in the high draft floating condition;

said vessel having a length to width ratio of at least 2 to 1.]

[53. A vessel according to claim 52 including a crane for transferring loads between horizontally spaced positions.]

[54. A vessel according to claim 52 wherein said platform is spaced above said base structure a predetermined height at least equal to the height of the maximum anticipated wave, said columns extending vertically a predetermined effective height at least equal to the height of the maximum anticipated wave.]

[55. A vessel according to claim 52 wherein the natural periods in pitch and roll of the vessel lie within a range of 6 to 40 seconds.]

[56. A vessel according to claim 52 wherein said ballasting and deballasting means includes at least two ballast compartments carried by said base structure on each of the opposite sides of the centerline of said vessel, said two ballast compartments being horizontally spaced one from the other, and means for effecting ballast transfer into and out of said two compartments on each side of said vessel to alter the natural period of said vessel.]

[57. A vessel according to claim 52 wherein at least one column on eah of the opposite sides of the roll axis is oblong with its long axis extending substantially parallel to the longitudinal centerline of said vessel.]

[58. A variable draft column stabilized vessel comprising: a pair of elongated flotation members disposed in side-by-side spaced substantially parallel relation one to the other;

a working platform;

means connected to said members and said platform to support said platform in fixed spaced relation above said members;

said connected means including at least six stabilizing columns disposed on said members and upstanding therefrom a predetermined height;

a pair of said columns being located adjacent opposite ends of said members on opposite sides of the pitch axis of said vessel, at least three columns being located on each member and on opposite sides of the roll axis of said vessel, at least one column on each member being substantially oblong in cross section and disposed such that its long axis extends substantially parallel to the longitudinal axes of the members;

the cross sectional area of said columns being substantially constant throughout the height thereof;

said members having a combined displacement sufficient to float the vessel in a low draft condition with the members having freeboard;

means for ballasting and deballasting said vessel to respectively submerge the members and portions of said connecting means below said platform below the waterline thereby to provide a high draft, otherwise unsupported, floating condition and return said vessel to the low draft condition with the members having freeboard, the displacement of the submerged members and portions of said connecting means being sufficient to maintain said vessel buoyant in the high draft floating condition;

the combined water plane areas of said columns forming at least the major portion of the total water plane area of said vessel in the high draft condition;

said connecting means being spaced one from the other to provide an open frame area between the components thereof and between said platform and said members;

and means carried by the vessel for conducting drilling operations while the vessel is maintained in the high draft floating condition.]

[59. A vessel according to claim 58 including a crane for transferring loads between horizontally spaced positions.]

[60. A vessel according to claim 58 wherein the cross sectional area and configuration of said columns, the weight distribution of the vessel and the geometry of the submerged members and portions of said connecting means are such as to provide motion minimizing characteristics to said vessel in roll, pitch and heave in the high draft condition.]

[61. The vessel according to claim 58 wherein said members are connected one to the other by said connecting means with the area between said members below a horizontal plane extending through said members adjacent their upper surfaces being open and substantially unobstructed.]

[62. A variable draft vessel according to claim 58 wherein said platform is supported in spaced relation above said members a predetermined height at least equal to the height of the maximum anticipated wave, said columns upstanding from said members an effective height at least equal to the height of the maximum anticipated wave, the displacement of said submerged members and portions of said connecting means being sufficient to maintain said vessel buoyant in the high draft condition with the mean waterline located a distance above said members at substantially one-half the effective height of said stabilizing columns.]

[63. A vessel according to claim 58 wherein said connecting means includes a plurality of support members forming trusses extending between said members and said platform at spaced longitudinal positions along said vessel, said trusses including transversely extending members lying adjacent the uppermost portions of said members.]

[64. A vessel according to claim 58 wherein each of said members has streamlined bow and stern portions to minimize resistance to movement through the water in said low draft condition.]

[65. A vessel according to claim 58 wherein said ballasting and deballasting means includes at least two ballast compartments in each of said members, said two ballast compartments being horizontally spaced one from the other, and means for selectively ballasting and deballasting said two compartments in each said member.]

[66. A vessel according to claim 58 wherein said drilling means includes a drilling mast disposed substantially along the longitudinal centerline of the vessel for supporting a drill string extending between said members.]

[67. A vessel according to claim 58 wherein said vessel has a length to width ratio of at least 2 to 1.]

[68. A vessel according to claim 58 wherein said platform is supported in spaced relation above said members a predetermined height at least equal to the height of the maximum anticipated wave, said columns upstanding from said members an effective height at least equal to the height of the maximum anticipated wave, the displacement of said submerged members and portions of said connecting means being sufficient to maintain said vessel buoyant in the high draft condition with the mean waterline located a distance above said members at substantially one-half the effective height of said stabilizing columns, said connecting means including a plurality of support members forming trusses extending between said members and said platform at spaced longitudinal positions along said vessel, said trusses including transversely extending members connectng one flotation member to the other and lying adjacent the uppermost portions of said flotation members, said ballasting and deballasting means including at least two ballast compartments in each of said flotation members, said two ballast compartments being horizontally spaced one from the other, and means for selectively ballasting and deballasting the compartments in each said member.]

[69. A vessel according to claim 58 wherein the centroids of said columns are spaced outboard of vertical planes containing the longitudinal axes of said members.]

[70. A variable draft vessel comprising: a pair of elongated flotation members disposed in side-by-side spaced substantially parallel relation one to the other;

a working platform;

means connected to said members and said platform to support said platform in fixed spaced relation above said members;

said connecting means including at least six upstanding stabilizing columns disposed on said members, a pair of said columns being located adjacent opposite ends of said members on opposite side of the pitch axis of the vessel, at least three columns being located on each member and on opposite sides of the roll axis of the vessel, the centroids of said columns being spaced outboard of vertical planes containing the longitudinal axes of said members;

the cross sectional area of said columns being substantially constant throughout the height thereof;

said members having a combined displacement sufficient to float the vessel in a low draft condition with the members having freeboard;

means for ballasting and deballasting the vessel to respectively submerge the members and portions of said connecting means below said platform below the waterline thereby to provide a high draft, otherwise unsupported, floating condition and return the vessel to the low draft condition with the members having freeboard, the displacement of the submerged members and portions of said connecting means being sufficient to maintain the vessel buoyant in the high draft floating condition;

said connecting means being spaced one from the other to provide an open frame area between the components thereof and between said platform and said members;

the combined water plane area of said columns forming at least the major portion of the total water plane area of said vessel in the high draft condition;

the cross sectional area and configuration of said columns, the weight distribution of the vessel, and the geometry of the submerged members and portions of said connecting means being such as to provide motion minimizing characteristics to said vessel in roll, pitch and heave in the high draft condition;

and means carried by the vessel for conducting drilling operations while the vessel is maintained in the high draft floating condition.]

[71. A vessel according to claim 70 including a crane for transferring loads between horizontally spaced positions.]

[72. A vessel according to claim 70 wherein the cross sectional area of said columns is substantially constant throughout the predetermined height thereof.]

[73. A variable draft vessel according to claim 70 wherein said platform is supported in spaced relation above said members a predetermined height at least equal to the height of the maximum anticipated wave, said columns upstanding from said members an effective height at least equal to the height of the maximum anticipated wave, the displacement of said submerged members and portions of said connecting means being sufficient to maintain said vessel buoyant in the high draft condition with the mean waterline located a distance above said members at substantially one-half the effective height of said stabilizing columns.]

[74. A vessel according to claim 70 wherein said ballasting and deballasting means includes at least two ballast compartments in each of said members, said two ballast compartments being horizontally spaced one from the other, and means for selectively ballasting and deballasting said two compartments in each said member.]

[75. A vessel according to claim 70 wherein said drilling means includes a drilling mast disposed substantially along the longitudinal centerline of the vessel for supporting a drill string extending between said members.]

[76. A vessel according to claim 70 wherein each of said members has streamlined bow portions to minimize resistance to movement through the water in said low draft condition.]

[77. A vessel according to claim 70 wherein said platform is supported in spaced relation above said members a predetermined height at least equal to the height of the maximum anticipated wave, said columns upstanding from said members an effective height at least equal to the height of the maximum anticipated wave, the displacement of said submerged members and portions of said connecting means being sufficient to maintain said vessel buoyant in the high draft condition with the mean waterline located a distance above said members at substantially one-half the effective height of said stabilizing columns, said ballasting and deballasting means including at least two ballast compartments in each of said members, said two ballast compartments being horizontally spaced one from the other, and means for selectively ballasting and deballasting said two compartments in each said member, each of said members having streamlined bow portions to minimize resistance to movement through the water in said low draft condition.]

[78. A variable draft vessel comprising:

a pair of discrete elongated flotation members disposed in side-by-side spaced substantially parallel relation one to the other;

a working platform;

means for supporting said platform in fixed spaced relation above said members;

said connecting means including at least six stabilizing columns disposed on said members and upstanding therefrom, a pair of said columns being located adjacent opposite ends of said members on opposite sides of the pitch axis of said vessel, at least three columns being located on each member and on opposite sides of the roll axis of said vessel;

the cross sectional area of said columns being substantially constant throughout the height thereof;

at least one of said columns on each said member being substantially oblong in cross section and disposed such that its long axis extends substantially parallel to the longitudinal axes of said members;

means for ballasting and deballasting said vessel to selectively obtain high and low draft, otherwise unsupported, floating conditions with said members and portions of said connecting means below said platform located below the waterline in the high draft floating condition, the displacement of said members and portions of said connecting means being sufficient to maintain said vessel buoyant in the high draft floating condition;

the combined water plane areas of said columns forming at least the major portion of the total water plane area of said vessel in the high draft condition; and means carried by the vessel for conducting drilling operations while the vessel is maintained in the high draft floating condition.]

[79. A variable draft vessel comprising:

a pair of discrete elongated flotation members disposed in side-by-side spaced substantially parallel relation one to the other;

a working platform;

means for supporting said platform in fixed spaced relation above said members;

said connecting means including at least six stabilizing columns disposed on said members and upstanding therefrom, a pair of said columns being located adjacent opposite ends of said members on opposite sides of the pitch axis of said vessel, at least three columns being located on each member and on opposite sides of the roll axis of said vessel;

at least one of said columns on each of said member being substantially oblong in cross section and disposed such that its long axis extends substantially parallel to the longitudinal axes of said members;

and means for ballasting and deballasting said vessel to selectively obtain high and low draft conditions with said members and portions of said connecting means below said platform located below the waterline in the high draft condition, the displacement of said members and portions of said connecting means being sufficient to maintain said vessel buoyant in the high draft condition;

said columns being substantially constant in cross sectional area throughout their height, said vessel having a length to width ratio greater than 2 to 1.

[ 80. The vessel according to claim 79 wherein the centroid of said oblong column on each said member lies outboard of vertical planes passing through the longitudinal centerlines of said member.]

[ 81. The vessel according to claim 79 wherein said ballasting and deballasting means includes at least two ballast compartments in each of said members, said two ballast compartments being horizontally spaced one from the other, and means for selectively ballasting and deballasting said two compartments in each said member.]

[ 82. The vessel according to claim 79 including a derrick.]

83. A variable draft vessel comprising:

a base structure having hydrostatic and hydrodynamic characteristics;

a working platform;

a plurality of elements carried by said base structure with at least a portion of said elements upstanding therefrom and being connected to said platform to support said platform in spaced relation above said base structure, at least a portion of said elements including at least four stabilizing columns carried by said base structure and extending vertically a predetermined effective height between generally horizontal planes containing said platform and said base structure, a pair of said columns being located adjacent opposite ends of said base structure on opposite sides of the pitch axis of the vessel, at least two columns being located on opposite sides of the roll axis of the vessel;

said base structure having displacement sufficient to float the vessel in a low draft condition with the base structure having freeboard;

and means for ballasting and deballasting the vessel to respectively submerge the base structure and portions of said elements below the waterline thereby to provide a high draft condition and return the vessel with the base structure having freeboard;

said elements being spaced one from the other to provide an open frame area therebetween and between said platform and said base structure;

the cross sectional areas and configuration of said columns, the weight distribution of the vessel and the geometry of the submerged base structure and portions of said elements being such that the vessel obtains a natural period in the high draft condition no less than 6 seconds;

said vessel having a length to width ratio of at least 2 to 1;

said stabilizing [ column ] *columns* having portions thereof which extend transversely beyond the outboard sides of said base structure thereby providing increased moment for stabilizing action about the roll axis.

[ 84. A variable draft vessel comprising:

a pair of elongated hulls disposed in side-by-side spaced substantially parallel relation one to the other;

a working platform;

means connected to said hulls and said platform to support said platform in fixed spaced relation above said hulls;

said connecting means including at least four stabilizing columns located on said hulls with a pair of said columns on each of the opposite sides of the respective pitch and roll axes of the vessel;

said platform being spaced above said hulls a predetermined height at least equal to the height of the maximum anticipated wave, said columns upstanding from said hulls a predetermined effective height at least equal to the height of the maximum anticipated wave, the cross sectional area of said columns being substantially constant throughout the effective height thereof;

said hulls having a combined displacement sufficient to float the vessel in a low draft condition with the hulls having freeboard, each of said hulls having bow and stern designs to minimize resistance to movement through the water in said low draft condition;

means for ballasting and deballasting the vessel to respectively submerge the hulls and portions of said connecting means below said platform below the waterline thereby to provide a high draft, otherwise unsupported, floating condition and return the vessel to the low draft condition with the hulls having freeboard, the displacement of the submerged hulls and portions of said connecting means being sufficient to maintain the vessel buoyant in the high draft floating condition;

said connecting means being spaced one from the other to provide an open frame area between the components thereof, and between said hulls and said platform;

the combined water plane areas of said columns forming at least the major portion of the total water plane area of said vessel in the high draft condition;

the cross sectional area and configuration of the columns, the weight distribution of the vessel, and the geometry of the submerged hulls and portions of said connecting means being such that the vessel obtains motion minimizing characteristics in the high draft condition; and means carried by the vessel for conducting drilling operations while the vessel is maintained in the high draft floating condition.]

*85. A vessel according to claim 83 wherein said base structure includes a pair of elongated hulls disposed in side-by-side spaced substantially parallel relation one to the other, at least a portion of said elements including a plurality of trusses extending between said hulls and said platform and in spaced longitudinal positions along said vessel, said trusses including substantially horizontally extending members disposed adjacent uppermost portions of said hulls and restraining the hulls against lateral displacement with respect to each other.*

*86. A column stabilized semisubmersible vessel consisting of a pair of elongated hulls disposed in substantially parallel spaced side-by-side relation with each of said hulls spaced from and lying on an opposite side of the longitudinal centerline of said vessel, said vessel further comprising:*

*a working platform spaced above said hulls a predetermined height and normally lying in a generally horizontal plane;*

*means for supporting said platform in fixed spaced relation above said hulls including at least three pairs of upstanding columns connecting with each of said hulls and said platform; each of said columns having a substantially constant cross sectional area over the effective height of the column between the platform and associated hull;*

*each of said hulls having, over substantially the entire length thereof, a substantially rectangular transverse cross section with its breadth greater than its height;*

*a plurality of longitudinally spaced structural truss means interconnecting and reinforcing the structural relationship of the hulls, platform and columns, with such truss means including substantially transversely extending members structurally interconnecting uppermost portions of the hulls;*

*said vessel being generally rectangular in plan with the length of said vessel along its longitudinal centerline and roll axis being at least 2.5 times greater than the width of said vessel along its transverse centerline and pitch axis;*

*at least three of said columns being located on each of said two hulls on opposite sides of the vessel's roll axis with pairs of such columns being located near opposite ends of each of said hulls on opposite sides of the vessel's pitch axis and another pair of said columns being located at an intermediate position on each of said hulls;*

*each of said columns having an oblong cross section with a dimension extending in the direction of the vessel's longitudinal axis greater than the column's dimension extending transversely of the vessel;*

*the centroid of the cross section of each column on said hulls lying outboard of the longitudinal centerline of the associated hull;*

*the configuration and cross-sectional areas of said columns throughout effective height thereof and the distances of said columns from the vessel's longitudinal roll axis and transverse pitch axis being such that said columns maintain the vessel's metacenter above the vessel's center of gravity for all high draft semisubmerged operating positions of the vessel and also being such that said columns provide righting moment about the longitudinal roll axis which is less than righting moment provided about said transverse pitch axis when the vessel is in semisubmerged column stabilized operating positions;*

*said hulls having ballast compartments;*

*means for ballasting said vessel when required to alter its draft between a low draft hull-supported floating condition in which the hulls have freeboard with said transversely extending members structurally interconnecting uppermost portions of the hulls being disposed above the mean waterline and a high draft semisubmerged column stabilized floating and operating condition in which the mean waterline is located along intermediate portions of said columns above said hulls and below the underside of said platform;*

*said means for ballasting including means for adjusting vessel angle of heel change caused during semisubmerged operations to provide a reduction of the vessel's angle of heel about its roll axis when required during semisubmerged column stabilized operations; and*

*said means for ballasting including means for adjusting vessel angle of trim change caused during semisubmerged operations to provide a reduction of the vessel's angle of trim about its pitch axis when required during semisubmerged column stabilized operations.*

*87. A vessel according to claim 86, wherein the ballast compartment of each of said rectangular twin hulls includes at least two separate ballast compartments spaced transversely within each hull and a plurality of separate ballast compartments spaced longitudinally within each hull.*

*88. A vessel according to claim 86 wherein said vessel ballast means includes means for transferring ballast directly from one of said rectangular twin hulls directly to the other of said rectangular twin hulls for controlling heel of said vessel about its roll axis when required during semisubmerged column stabilized operations.*

*89. A vessel according to claim 86, wherein: the ballast compartments of each of said rectangular twin hulls includes at last two separate ballast compartments spaced transversely within each hull and a plurality of separate ballast compartments spaced longitudinally within each hull; and said vessel ballast means also includes means for transferring ballast from at least one compartment in one hull directly to at least one compartment in the other hull for controlling the heel of said vessel about its roll axis when required during semisubmerged column stabilized operations.*

*90. A column stabilized semisubmersible drilling vessel comprising a vessel according to claim 86 and further comprising:*

*a drilling rig carried by said platform;*

*means carried by said vessel for accommodating sufficient drilling equipment for conducting offshore drilling operations in column stabilized semisubmerged high draft condition;*

*said vessel ballast means including means for counteracting change in vessel angle of trim caused when said vessel is in said high draft column stabilized semisubmerged condition for drilling operations and is subjected to load change of such location and magnitude with respect to the pitch axis so that such ballast means provides when required a reduction of the vessel's angle of trim about its pitch axis during semisubmerged column stabilized drilling operations; and*

*said vessel ballast means also including means for similarly counteracting angle of heel caused when said vessel is in said high draft semisubmerged condition for drilling and is subjected to load change of such location and magnitude with respect to the roll axis so that such ballast means provides when required a reduction of the vessel's angle of heel about its roll axis during high draft semisubmerged column stabilized drilling operations.*

*91. A vessel as in claim 86 wherein: said transversely extending members have opposite end portions overlying top surfaces of said hulls with their opposite ends connected to columns on each of said hulls near said top surfaces.*

92. A vessel according to claim 91 wherein: said opposite end portions of said transversely extending members are secured to said top surfaces of said hulls.

93. A column stabilized semisubmersible vessel consisting of a pair of elongated hulls disposed in substantially parallel spaced side-by-side relation with each of said hulls spaced from and lying on an opposite side of the longitudinal centerline of said vessel, said vessel further comprising:

a working platform spaced above said hulls a predetermined height and normally lying in a generally horizontal plane;

means for supporting said platform in fixed spaced relation above said hulls including at least three pairs of upstanding columns connecting with each of said hulls and said platform; each of said columns having a substantially constant cross sectional area over the effective height of the column between the platform and associated hull;

each of said hulls having an oblong transverse cross section with a breadth greater than its height and having top and bottom substantially planar parallel surfaces extending substantially the entire length of each hull, whereby such hulls configuration provides increased mass resistance to movement of said hulls and vessel through water in a vertical direction when the vessel is in high draft semisubmerged column stabilized operating condition;

a plurality of longitudinally spaced structural truss means interconnecting and reinforcing the structural relationship of the hulls, platform and columns, with such truss means including substantially transversely extending members structurally interconnecting uppermost portions of the hulls;

said vessel being generally rectangular in plan with the length of said vessel along its longitudinal centerline and roll axis being at least plural times as great as the width of said vessel along its transverse centerline and pitch axis;

at least three of said columns being located on each of said two hulls on opposite sides of the vessel's roll axis with pairs of such columns being located near opposite ends of each of said hulls on opposite sides of the vessel's pitch axis and another pair of said columns being located at an intermediate position on each of said hulls;

at least one of said columns on each said hull having an oblong cross section with a dimension extending in the direction of the longitudinal vessel axis greater than the columns' transversely extending dimension; the centroid of the cross section of such oblong columns lying outboard of the longitudinal centerline of each associated hull;

the configuration and cross-sectional areas of said columns throughout effective height thereof and the distances of said columns from the vessel's longitudinal roll axis and transverse pitch axis being such that said columns maintain the vessel's metacenter above the vessel's center of gravity for all high draft semisubmerged operating positions of the vessel and also being such that said columns provide righting moment about the longitudinal roll axis which is less than righting moment provided about said transverse pitch axis when the vessel is in semisubmerged column stabilized operating position;

said hulls having ballast compartments;

means for ballasting said vessel when required to alter its draft between a low draft hull-supported floating condition in which the hulls have freeboard with said transversely extending members structurally interconnecting uppermost portions of the hulls being disposed above the mean waterline and a high draft semisubmerged column stabilized floating and operating condition in which the mean waterline is located along intermediate portion of said columns above said hulls and below the underside of said platform;

the ballast compartments of each of said oblong twin hulls including at least two separate ballast compartments spaced transversely within each hull and a plurality of separate ballast compartments spaced longitudinally within each hull.

94. A vessel according to claim 93, wherein said means for ballasting includes means for adjusting vessel angle of heel change caused during semisubmerged operations to provide a reduction of the vessel's angle of heel about its roll axis when required during semisubmerged column stabilized operations.

95. A vessel according to claim 93, wherein said means for ballasting includes means for adjusting vessel angle of trim change caused during semisubmerged operations to provide a reduction of the vessel's angle of trim about its pitch axis when required during operations of said vessel in semisubmerged column stabilized operations.

96. A vessel according to claim 93, wherein said vessel ballast means includes means for transferring ballast directly from one hull to the other hull to control heel of said vessel about its roll axis during semisubmerged column stabilized operations.

97. A vessel according to claim 93, wherein all of said columns have such an oblong cross section with greater dimension extending in direction of the vessel's longitudinal axis.

98. A vessel according to claim 97 wherein the centroid of all of said columns lies outboard of the longitudinal centerline of each associated hull.

99. A vessel according to claim 93, wherein each of said hulls is generally rectangular in cross section.

100. A vessel according to claim 93, wherein said vessel has a length to width ratio of at least 2.5 to 1.

101. A vessel according to claim 93, wherein said vessel has a length which is at least 2.5 times as great as its width; each of said columns has an oblong cross section with a dimension extending in the direction of the longitudinal vessel axis greater than the column's dimension extending transversly of the vessel; the centroid of the cross section of each column on each hull lies outboard of the longitudinal centerline of the associated hull; each of said hulls is generally rectangular in cross section; and said transversely extending members structurally interconnect said hulls adjacent uppermost portions thereof.

102. A vessel according to claim 101 wherein said vessel ballasting means includes means operable to transfer ballast from at least one compartment in one hull directly to at least one compartment in the other hull to control the heel of said vessel about its roll axis when required during column stabilized semisubmerged operations.

103. A column stabilized semisubmersible drilling vessel comprising a vessel according to claim 93 and further comprising:

a drilling rig carried by said platform;

means carried by said vessel for accommodating sufficient drilling equipment for conducting offshore drilling operations in column stabilized semisubmerged high draft condition;

*said vessel ballast means including means for counteracting change in vessel angle of trim caused when said vessel is in said high draft column stabilized semisubmerged condition for drilling operations and is subjected to load change of such location and magnitude with respect to the pitch axis so that such ballast means provides when required a reduction of the vessel's angle of trim about its pitch axis during semisubmerged column stabilized drilling operations; and*

*said vessel ballast means also including means for similarly counteracting angle of heel caused when said vessel is in said high draft semisubmerged condition for drilling and is subjected to load change of such location and magnitude with respect to the roll axis so that such ballast means provides when required a reduction of the vessel's angle of heel about its roll axis during high draft semisubmerged column stabilized drilling operations.*

*104. A vessel as in claim 93 wherein: said transversely extending members have opposite end portions overlying top surfaces of said hulls with their opposite ends connected to columns on each of said hulls near said top surfaces.*

*105. A vessel according to claim 104 wherein: said opposite end portions of said transversely extending members are secured to said top surfaces of said hulls.*

*106. A column stabilized semisubmersible vessel consisting of a pair of elongated hulls disposed in substantially parallel spaced side-by-side relation with each of said hulls spaced from and lying on an opposite side of the longitudinal centerline of said vessel, said vessel further comprising;*

*a working platform spaced above said hulls a predetermined height and normally lying in a generally horizontal plane;*

*means for supporting said platform in fixed spaced relation above said hulls including at least three pairs of upstanding columns connecting with each of said hulls and said platform, each of said columns having a substantially constant cross sectional area over the effective height of the column between the platform and associated hull;*

*each of said hulls having an oblong transverse cross section with a breadth greater than its height and having top and bottom substantially planar parallel surfaces extending substantially the entire length of each hull;*

*a plurality of longitudinally spaced structural truss means interconnecting and reinforcing the structural relationship of the hulls, platform and columns, with such truss means including substantially transversely extending members structurally interconnecting uppermost portions of the hulls;*

*said vessel being generally rectangular in plan with the length of said vessel along its longitudinal centerline and roll axis being at least plural times as great as the width of said vessel along its transverse centerline and pitch axis;*

*at least three of said columns being located on each of said two hulls on opposite sides of the vessel's roll axis with pairs of such columns being located near opposite ends of each of said hulls on opposite sides of the vessel's pitch axis and another pair of said columns being located at an intermediate position on each of said hulls;*

*the configuration and cross-sectional areas of said columns throughout effective height thereof and the distances of said columns from the vessel's longitudinal roll axis and transverse pitch axis being such that said columns maintain the vessel's metacenter above the vessel's center of gravity for the high draft semisubmerged operating positions of the vessel and also being such that said columns provide righting moment about the longitudinal roll axis which is less than righting moment provided about said transverse pitch axis when the vessel is in semisubmerged column stabilized operating position;*

*said hulls having ballast compartments; and*

*means for ballasting said vessel when required to alter its draft between a low draft hull-supported floating condition in which the hulls have freeboard with said transversely extending members structurally interconnecting uppermost portions of the hulls being disposed above the mean waterline and a high draft semisubmerged column stabilized floating and operating condition in which the mean waterline is located along intermediate portion of said columns above said hulls and below the underside of said platform.*

*107. A vessel according to claim 106, wherein: said means for ballasting includes means for adjusting vessel angle of heel change caused during semisubmerged operations to provide a reduction of the vessel's angle of heel about its roll axis when required during semisubmerged column stabilized operations; and*

*said means for ballasting also includes means for adjusting vessel angle of trim change caused during semisubmerged operations to provide a reduction of the vessel's angle of trim about its pitch axis when required during operations of said vessel in semisubmerged column stabilized operations.*

*108. A vessel according to claim 106, wherein the ballast compartment of each of said hulls includes at least two separate ballast compartments spaced transversely within each hull and a plurality of separate ballast compartments spaced longitudinally within each hull.*

*109. A vessel according to claim 106, wherein said vessel ballast means includes means for transferring ballast directly from one hull to the other hull to control heel of said vessel about its roll axis when required during semisubmerged column stabilized floating operations.*

*110. A vessel according to claim 106 wherein at least one of the columns on each said hull has an oblong cross section with a dimension extending in the direction of the longitudinal vessel axis greater than the column's transversely extending dimension.*

*111. A vessel according to claim 110 wherein all of said columns have such an oblong cross section with greater dimension extending in direction of the vessel's longitudinal axis.*

*112. A vessel according to claim 106 wherein the centroid of the cross section of at least one column on each hull lies outboard of the longitudinal centerline of the associated hull.*

*113. A vessel according to claim 112 wherein the centroid of all of said columns lies outboard of the longitudinal centerline of the associated hull.*

*114. A vessel according to claim 106, wherein: each of said columns has a cross section with a dimension extending in the direction of the vessel's longitudinal axis greater than the column's dimension extending transversely of the vessel, with the centroid of the cross section of each column on each hull lying outboard of the longitudinal centerline of the associated hull.*

*115. A vessel according to claim 106, wherein each of said hulls is generally rectangular in cross section.*

*116. A vessel according to claim 106, wherein said vessel has a length to width ratio of at least 2.0 to 1.*

*117. A vessel according to claim 106, wherein: said vessel has a length which is at least 2.5 times as great as its width; each of said columns has an oblong cross section with a dimension extending in the direction of the longitudinal vessel axis greater than the column's dimension extending transversely of the vessel; the centroid of the cross section of each column on each hull lies outboard of the longitudinal centerline of the associated hull; each of said hulls is generally rectangular in cross section; and said transversely extending members structurally interconnect said hulls adjacent uppermost portions thereof.*

*118. A vessel according to claim 117, wherein: the ballst compartment of each of said hulls includes at least two separate ballast compartments spaced transversely within each hull and a plurality of separate ballast compartments spaced longitudinally of the hull; said means for ballasting includes means for adjusting vessel angle of heel change caused during semisubmerged operations to provide a reduction of the vessel's angle of heel about its roll axis when required during semisubmerged columns stabilized operations; said means for ballasting also includes means for adjusting vessel angle of trim change caused during semisubmerged operations to provide a reduction of the vessel's angle of trim about its pitch axis when required during operations of said vessel in semisubmerged column stabilized operations; and said vessel ballast means also includes means operable to transfer ballast from at least one compartment in one hull directly to at least one compartment in the other hull to control the heel of said vessel about its roll axis during semisubmerged operations.*

*119. A vessel according to claim 106 wherein at least the upper end of said columns is modified in cross section to provide mechanical connection between the columns and the platform.*

*120. A vessel according to claim 119, wherein said modified column cross section includes a frustoconical section.*

*121. A vessel according to claim 106 wherein at least the lower end of said columns is modified in cross section to provide mechanical connection between the columns and the associated hulls.*

*122. A vessel according to claim 121 wherein said modified column cross section includes a frustoconical section.*

*123. A column stabilized semisubmersible drilling vessel comprising a vessel according to claim 106 and further comprising:*

*a drilling rig carried by said platform;*

*means carried by said vessel for accommodating sufficient drilling equipment for conducting offshore drilling operations in column stabilized semisubmerged high draft condition;*

*said vessel ballast means including means for counteracting change in vessel angle of trim caused when said vessel is in said high draft column stabilized semisubmerged condition for drilling operations and is subjected to load change of such location and magnitude with respect to the pitch axis so that such ballast means provides when required a reduction of the vessel's angle of trim about its pitch axis during semisubmerged column stabilized drilling operations; and*

*said vessel ballast means also including means for similarly counteracting angle of heel caused when said vessel is in said high draft semisubmerged condition for drilling and is subjected to load change of such location and magnitude with respect to the roll axis so that such ballast means provides when required a reduction of the vessel's angle of heel about its roll axis during high draft semisubmerged column stabilized drilling operations.*

*124. A vessel as in claim 106, wherein the centroids of the water plane areas defined by the cross sections of the columns are located outboard of the centerlines of the hulls an extended distance from the centerline of the vessel on opposite sides of the longitudinally extending roll axis to develop larger moments of intertia of the water plane area about the roll axis (than would otherwise be the case if the longitudinal centerlines of said hulls and their associated columns were coincident).*

*125. A vessel as in claim 106, wherein the vessel has six columns including three columns on each hull, with one middle pair of columns located adjacent the vessel's transverse pitch axis and with two other pairs of columns located adjacent the vessel's transverse pitch axis and with two other pairs of columns on opposite sides of the vessel pitch axis in generally symmetrical relation thereto near opposite ends of the associated hulls.*

*126. A vessel as in claim 106, wherein: the vessel has a total odd number of pairs of columns and the middle pair of columns is located adjacent the vessel's pitch axis, with the remaining pairs of columns being disposed in equal numbers on opposite sides of the vessel pitch axis and with two pairs of columns located near opposite ends of said hulls.*

*127. A vessel as in claim 106, wherein: the vessel has a total even number of pairs of columns and the middle two pairs of columns are located on opposite sides of and near the transverse pitch axis; the remaining pairs of said columns being located outwardly of said middle pairs of columns and including two pairs of each columns on the hulls near opposite ends of said hulls.*

*128. A vessel as claimed in claim 106, wherein said stabilizing columns have outboard portions thereof which extend transversely beyond the outboard sides of the respective hulls.*

*129. A vessel as in claim 106 wherein: said transversely extending members have opposite end portions overlying top surfaces of said hulls with their opposite ends connected to columns on each of said hulls near said top surfaces.*

*130. A vessel according to claim 129 wherein: said opposite end portions of said transversely extending members are secured to said top surfaces of said hulls.*

*131. A column stabilized semisubmersible vessel consisting of a pair of elongated hulls disposed in substantially parallel spaced side-by-side relation with each of said hulls spaced from and lying on an opposite side of the longitudinal centerline of said vessel, said vessel further comprising:*

*a working platform spaced above said hulls a predetermined height and lying in a generally horizontal plane;*

*means for supporting said platform in fixed spaced relation above said hulls including at least three pairs of upstanding columns connecting with each of said hulls and said platform;*

*each of said columns having a substantially constant cross sectional area over the effective height of the column between the platform and associated hull;*

*each of said hulls having an oblong transverse cross section with a breadth greater than its height and having top and bottom substantially planar parallel surfaces extending substantially the entire length of each hull, whereby such hull's configuration provides increased mass resistance to movement of said hulls and vessel through water in a vertical direction when the vessel is in high draft semisubmerged column stabilized operating condition;*

*a plurality of longitudinally spaced structural truss means interconnecting and reinforcing the structural relationship of the hulls, platform and columns, with such truss means including substantially transversely extending members structurally interconnecting uppermost portions of the hulls;*

*said vessel being generally rectangular in plan with the length of said vessel along its longitudinal centerline and roll axis being substantially greater than the width of said vessel along its transverse centerline and pitch axis;*

*at least three of said columns being located on each of said two hulls on opposite sides of the vessel's roll axis with pairs of such columns being located near opposite ends of each of said hulls on opposite sides of the vessel's pitch axis and another pair of said columns being located at an intermediate position on each of said hulls;*

*the configuration and cross-sectional areas of said columns throughout effective height thereof and the distances of said columns from the vessel's longitudinal roll axis and transverse pitch axis being such that said columns maintain the vessel's metacenter above the vessel's center of gravity for all high draft semisubmerged operating positions of the vessel and also being such that said columns provide righting moment about the longitudinal roll axis which is less than righting moment provided about said transverse pitch axis when the vessel is in semisubmerged column stabilized operating position;*

*said hulls having ballast compartments;*

*means for ballasting said vessel when required to alter its draft between a low draft hull-supported floating condition in which the hulls have freeboard with said transversely extending members structurally interconnecting uppermost portions of the hulls being disposed above the mean waterline and a high draft semisubmerged column stabilized floating and operating condition in which the mean waterline is located along intermediate portion of said columns above said hulls and below the underside of said platform;*

*said means for ballasting including means for adjusting vessel angle of heel change caused during semisubmerged operations to provide a reduction of the vessel's angle of heel about its roll axis when required during semisubmerged column stabilized operations; and*

*said means for ballasting including means for adjusting vessel angle of trim change caused during semisubmerged operations to provide a reduction of the vessel's angle of trim about its pitch axis when required during semisubmerged column stabilized operations.*

*132. A vessel according to claim 131, wherein the ballast compartment of each of said hulls includes at least two separate ballast compartments spaced transversely within each hull and a plurality of separate ballast compartments spaced longitudinally within each hull.*

*133. A vessel according to claim 131, wherein said vessel ballast means includes means for transferring ballast directly from one hull to the other hull to control heel of said vessel about its roll axis when required during semisubmerged column stabilized floating operations.*

*134. A vessel according to claim 131 wherein each of said columns on said hulls has an oblong cross section with a dimension extending in the direction of the longitudinal vessel axis greater than the column's transversely extending dimension.*

*135. A vessel according to claim 131, wherein the centroid of the cross section of each of the columns on each hull lies outboard of the longitudinal centerline of the associated hull.*

*136. A vessel according to claim 131, wherein each of said columns has a cross section with a dimension extending in the direction of the vessel's longitudinal axis greater than the column's dimension extending transversely of the vessel; with the centroid of the cross section of each column on each hull lying outboard of the longitudinal centerline of the associated hull.*

*137. A vessel according to claim 131, wherein each of said hulls is generally rectangular in cross section.*

*138. A vessel according to claim 131, wherein said vessel has a length to width ratio of at least 2.5 to 1.*

*139. A vessel according to claim 131, wherein said vessel has a length which is at least plural times as great as its width; each of said columns has an oblong cross section with a dimension extending in the direction of the longitudinal vessel axis greater than the column's dimension extending transversely of the vessel; the centroid of the cross section of each column on each hull lies outboard of the longitudinal centerline of the associated hull; each of said hulls is generally rectangular in cross section; and said transversely extending members structurally interconnect said hulls adjacent uppermost portions thereof.*

*140. A vessel according to claim 139, wherein the ballast compartments of each of said hulls includes at least two separate ballast compartments spaced transversely within each hull and a plurality of separate ballast compartments spaced longitudinally of the hull; and said vessel also includes ballast means operable to transfer ballast from at least one compartment in one hull directly to at least one compartment in the other hull to control the heel of said vessel about its roll axis during semisubmerged operations.*

*141. A column stabilized semisubmersible drilling vessel comprising a vessel according to claim 131 and further comprising:*

*a drilling rig carried by said platform;*

*means carried by said vessel for accommodating sufficient drilling equipment for conducting offshore drilling operations in column stabilized semisubmerged high draft condition;*

*said vessel ballast means including means for counteracting change in vessel angle of trim caused when said vessel is in said high draft column stabilized semisubmerged condition for drilling operations and is subjected to load change at such location and magnitude with respect to the pitch axis so that such ballast means provides when required a reduction of the vessel's angle of trim about its pitch axis during semisubmerged column stabilized drilling operations, and*

*said vessel ballast means also including means for similarly counteracting angle of heel caused when said vessel is in said high draft semisubmerged condi-*

*tion for drilling and is subjected to load change of such location and magnitude with respect to the roll axis so that such ballast means provides when required a reduction of the vessel's angle of heel about its roll axis during high draft semisubmerged column stabilized drilling operations.*

*142. A vessel as in claim 131 wherein: said transversely extending members have opposite end portions overlying top surfaces of said hulls with their opposite ends connected to columns on each of said hulls near said top surfaces.*

*143. A vessel according to claim 142 wherein: said opposite end portions of said transversely extending members are secured to said top surfaces of said hulls.*

* * * * *